United States Patent [19]

Mizuno

[11] Patent Number: 5,587,996
[45] Date of Patent: Dec. 24, 1996

[54] METHOD OF RADIO-LINE RELIEF AND RADIO EQUIPMENT IN SDH NETWORK

[75] Inventor: Shingo Mizuno, Kawasaki, Japan

[73] Assignee: Fujitsu Limited, Kanagawa, Japan

[21] Appl. No.: 529,663

[22] Filed: Sep. 18, 1995

[30] Foreign Application Priority Data

Feb. 2, 1995 [JP] Japan ................................. 7-015749

[51] Int. Cl.$^6$ .................................................. H04B 10/08
[52] U.S. Cl. ................................ 370/228; 455/8; 359/110
[58] Field of Search ............................... 370/16, 16.1, 13, 370/14, 85.6, 112; 359/110; 455/8, 9; 340/825.01, 825.03, 827, 825.06, 895.51

[56] References Cited

U.S. PATENT DOCUMENTS

| | | | |
|---|---|---|---|
| 5,010,550 | 4/1991 | Hirata | 370/16 |
| 5,218,465 | 6/1993 | Lebby et al. | 370/16 |
| 5,365,510 | 11/1994 | Nicholson et al. | 370/16 |
| 5,493,432 | 2/1996 | Yoneda | 370/16 |

FOREIGN PATENT DOCUMENTS 0225643  6/1987  European Pat. Off. .

*Primary Examiner*—Douglas W. Olms
*Assistant Examiner*—Ajit Patel

[57] ABSTRACT

Radio working lines are provided to correspond to optical lines and a single radio standby line is provided. An optical-line failure detecting unit monitors occurrence of failure in each of the optical line, and a radio-line failure detecting unit monitors the occurrence of failure in each of the radio working lines. When occurrence of failure in an optical line has been detected, a relief-rank management unit makes the rank for relief of the radio working line corresponding to this optical line lower than rank for relief of radio working lines corresponding to optical lines that have not failed. When a failure has occurred in two or more radio working lines, a line changeover controller transmits data, which is to be sent to a radio working line that failed, via the radio standby line.

16 Claims, 21 Drawing Sheets

FIG. 10A

| R/W | HARD SOFT INTERFACE |
|---|---|
| R | ERROR COUNT OF LINE N |

R : READ , W : WRITE

FIG. 10B

| R/W | HARD SOFT INTERFACE | |
|---|---|---|
| R | PAIR CODE OF OPTICAL STANDBY/WORKING | INCOMING SIDE<br>K1 BYTE (b1~b4) OF LINE N |

SPECIFY PAIR BY PAIR CODE : 0000~1111

FIG. 10C

| R/W | HARD SOFT INTERFACE | | |
|---|---|---|---|
| R | 0/1 SYSTEM CODE | NULL | INCOMING SIDE<br>K2 BYTE (b6~b8) OF LINE |
| R | K2 BYTE (b1~b4) | NULL | OUTGOING SIDE<br>K2 BYTE (b6~b8) OF LINE |

0-SYSTEM CODE : 0000   1-SYSTEM CODE : 1111

FIG. 10D

| R/W | HARD SOFT INTERFACE | |
|---|---|---|
| W | LINE NUMBER (N) | RELIEF ORDER OF PRIORITY |

LINE NUMBER : ARRAY 1, 2, 3, 4, ··· IN NUMERICAL ORDER FROM HIGHER-ORDER ADDRESS

NUMBER OF ORDER OF PRIORITY : SET IN ORDER FROM HIGHEST-PRIORITY NUMBER 0001 TO LOWEST-PRIORITY NUMBER 1111

FIG. 18 (PRIOR ART)

| SYMBOL | USE IN NNI | | APPLICATION TO UNI |
|---|---|---|---|
| A1, A2 | FRAME SYNCHRONISM | ○ | |
| C1 | IDENTIFICATION NUMBER OF EACH STM-1 IN STM-N | ○ | |
| B1 | ERROR MONITORING IN REPEATER SECTION | △ | BIP-8 |
| E1 | AUDIO ARRANGEMENTS IN REPEATER SECTION | — | |
| F1 | MALFUNCTION SPECIFICATION IN REPEATER SECTION | — | |
| D1~D3 | DATA COMMUNICATION IN REPEATER SECTION | ○ | BIP-24×n (n=1 or 4) |
| B2 | SECTION ERROR MONITORING | — | |
| K1 | CONTROL OF CHANGEOVER SYSTEM | ○ | TRANSFER OF AIS/FERF OF SECTION |
| K2 | TRANSFER OF MULTIPLEX SECTION STATUS | — | |
| D4~D12 | DATA COMMUNICATION IN MULTIPLEX SECTION | — | |
| Z1 | MULTIPLEX STANDBY | ○ | |
| Z2 | NOTIFICATION OF MULTIPLEX ERROR STATUS | — | |
| B2 | AUDIO ARRANGEMENTS IN MULTIPLEX SECTION | | |

REPEATER SECTION OVERHEAD: A1,A2 — D1~D3
MULTIPLEX SECTION OVERHEAD: B2 — B2

| BIT | K1 | | | | | | | | K2 | | | | | | | |
|---|---|---|---|---|---|---|---|---|---|---|---|---|---|---|---|---|
| | b1 | b2 | b3 | b4 | b5 | b6 | b7 | b8 | b1 | b2 | b3 | b4 | b5 | b6 | b7 | b8 |
| SET CONTENT | TYPE OF CHANGEOVER REQUEST | | | | NUMBER OF WORKING TRANSMISSION LINE THAT OUTPUTTED CHANGEOVER REQUEST | | | | NUMBER OF WORKING LINE 0010:1-SYSTEM 0001:0-SYSTEM | | | | | STATUS OF TRANSMISSION LINE | | |

CHANGEOVER CONFIGURATION

METHOD OF RADIO-LINE RELIEF AND RADIO EQUIPMENT IN SDH NETWORK

BACKGROUND OF THE INVENTION

This invention relates to a method of relieving a radio line and to a radio equipment in a synchronous digital hierarchy (SDH) network. More particularly, the invention relates to a method of relieving a radio line and to a radio equipment in an SDH network in which a radio transmission line is installed between optical transmission lines having a plurality of optical lines.

The world-wide trend toward the adoption of the SDH scheme for networks in optical transmission is continuing. FIGS. 16A, 16B are diagrams for describing the structure of a frame in SDH. This is for a transmission rate of 155.52 Mbps. One frame is composed of 9×270 bytes. The first 9×9 bytes constitute section overhead (SOH), and the remaining bits constitute path overhead (POH) and payload (PL).

The section overhead SOH is a section which transmits information (frame synchronizing information) representing the beginning of the frame, information specific to the transmission line (namely information which checks for error at transmission time, information for network maintenance, etc.) and a pointer indicating the position of the path overhead POH. Path overhead POH is a section which transmits end-to-end monitoring information within a network. The payload PL is a section which transmits 150 Mbps information.

The section overhead SOH is composed of repeater section overhead of 3×9 bytes, a pointer of 1×9 bytes and multiplex section overhead of 5×9 bytes. As shown in FIG. 17, the multiplex section refers to the section between terminal repeater units 1, 2. In a case where a number of transmission lines 3a~3c and repeaters 4a, 4c are provided between the terminal repeater units 1, 2, the repeater section refers to the section between both ends of one transmission line. The multiplex section is composed of a plurality of repeater sections.

As shown in FIG. 16B, the repeater section overhead has bytes A1~A2, C1, B1, E1, F1, D1~D3, and the multiplex section overhead has bytes B2, K1~K2, D4~D12, Z1~Z2. The meaning of each byte is illustrated in FIG. 18. The repeater section overhead transmits frame synchronizing signals (bytes A1, A2), an error monitoring signal (byte B1) for monitoring error in the repeater section, a fault specifying signal (byte F1) for specifying a fault in the repeater section, etc. The multiplex section overhead transmits an error monitoring signal (byte B2) for monitoring error in the repeater section, a changeover signal (byte K1) for changing over between a standby system and a working system, and a transfer signal (byte K2) for transferring the status in the multiplex section. The repeater section overhead and multiplex section overhead have a number of undefined bytes. Use of these bytes is entrusted to the communications manufacturer concerned.

In FIG. 18, NNI, UNI, STM, BIP, AIS and FERF signify network node interface, user network interface, synchronous transport module, bit interleaved parity, alarm indication signal and far end receive failure, respectively.

FIG. 19 is a diagram for describing the definitions of bytes K1 and K2. The first four bits b1~b4 of byte K1 indicate the type of changeover request. For example, these bits designate the changeover between operation and standby. The remaining four bits b5~b8 of byte K1 indicate the number of a working transmission line that has outputted a changeover request. The first four bits b1~b4 of byte K2 indicate the number of a working line, the fifth bit b5 indicates the changeover configuration, and the sixth through eighth bits b6~b8 indicate status of the transmission line.

FIG. 20 is a diagram for describing BIP. When corresponding bits of each pixel have been added on, BIP-8 identifies whether the result is an even number or an odd number. When corresponding bits at demarcation every three bytes have been added on, BIP-24 identifies whether the result is an even number or an odd number.

An SDH frame is thus constructed and application of SDH to networks is progressing mainly in optical transmission. There are cases in which such an SDH network incorporates a radio transmission line. For example, in a case where an SDH network is constructed across the ocean or across steep mountainous areas, an optical cable must be laid on the ocean floor or across mountainous terrain. However, the work for laying such cables is a major undertaking and requires great expenditure. When an SDH network is constructed in areas where the laying of cable is difficult, as in the case of the ocean floor or steep mountain ranges, an optical transmission line is laid as far as the entrance to the area, an optical transmission line is laid from the exit of the area and a radio transmission line is introduced between these two optical transmission lines.

FIG. 21 illustrates a first example of the arrangement of an SDH network in which a radio transmission line is introduced into an optical transmission line. In this case transmission is performed while terminating the redundant lines of the optical transmission line. The network includes optical transmission units $11a$, $11b$ and radio units $12a$, $12b$. Optical transmission lines $13_{1W}$~$13_{2P}$ are laid between the optical transmission unit $11a$ and the radio unit $12a$. The optical transmission lines $13_{1W}$, $13_{2W}$ are working lines, and the optical transmission lines $13_{1P}$, $13_{2P}$ are standby lines. The standby lines $13_{1P}$, $13_{2P}$ become the working lines when failures develop in the working lines $13_{1W}$, $13_{2W}$, respectively. Identical data is transmitted on the working lines and standby lines.

Numerals $14_{1W}$, $14_{2W}$ denote radio working lines provided in correspondence with the optical working lines $13_{1W}$, $13_{2W}$, respectively. Numeral $14_P$ represents one radio standby line. The radio unit $12a$ terminates the optical standby lines and transmits data from the optical working lines $13_{1W}$, $13_{2W}$ to the radio unit $12b$ via the radio working lines $14_{1W}$, $14_{2W}$. Further, when a fault has developed in one of the radio working lines $14_{1W}$, $14_{2W}$, the radio unit $12a$ transmits data, which has been accepted from the corresponding optical working line, to the radio unit $12b$ via the radio standby line $14_P$, thereby relieving the failed radio working line.

Optical transmission lines $15_{1W}$~$15_{2P}$ are laid between the radio unit $12b$ and the optical transmission unit $11b$. The optical transmission lines $15_{1W}$, $15_{2W}$ are working lines, and the optical transmission lines $15_{1P}$, $15_{2P}$ are standby lines. The standby lines $15_{1P}$, $15_{2P}$ become the working lines when failures develop in the working lines $15_{1W}$, $15_{2W}$, respectively. The radio unit $12b$ sends the optical working line $15_{1W}$ and the optical standby line $15_{1P}$ data accepted from the first radio working line $14_{1W}$ or radio standby line $14_P$ (at the time of failure), and sends the optical working line $15_{2W}$ and the optical standby line $15_{2P}$ data accepted from the second radio working line $14_{2W}$ or radio standby line $14_P$ (at the time of failure). As a result, identical data is transmitted to the optical working lines and optical standby lines.

In FIG. 21, an optical working line and an optical standby line form a pair, at two of such pairs are provided. However, N (≧2) pairs are provided ordinarily. More specifically, the optical lines consists of N pairs of optical working lines and optical standby lines. The radio lines have radio working lines corresponding to the N-number of optical working lines as well as one radio standby line.

In accordance with this SDH network, radio working lines in the radio section need only be provided to correspond to the optical working lines. As a result, the number of radio channels can be made small and transmission efficiency can be improved. However, in a case where a fault occurs simultaneously in two radio working lines, only one line can be relieved. This results in a decline in network reliability.

FIG. 22 illustrates a second example of the arrangement of an SDH network in which a radio transmission line is introduced between optical transmission lines. In this case radio transmission is performed without terminating the redundant lines of the optical transmission line. The network includes the optical transmission units 11a, 11b and the radio units 12a, 12b. The optical transmission lines $13_{1W}$~$13_{2P}$ are laid between the optical transmission unit 11a and the radio unit 12a. The optical transmission lines $13_{1W}$, $13_{2W}$ are the working lines and the optical transmission lines $13_{1P}$, $13_{2P}$ are the standby lines. The standby lines $13_{1P}$, $13_{2P}$ become the working lines when failures develop in the working lines $13_{1W}$, $13_{2W}$, respectively. Identical data is transmitted on the currently working lines and standby lines.

Radio working lines $14_{1W}$~$14_{4W}$ are provided in correspondence with the optical working lines and optical standby lines $13_{1W}$~$13_{2P}$, respectively. Numeral $14_P$ represents the single radio standby line. The radio unit 12a transmits data from the optical working lines $13_{1W}$, $13_{2W}$ to the radio unit 12b via the radio working lines $14_{1W}$, $14_{3W}$ and transmits data from the optical standby lines $13_{1P}$, $13_{2P}$ to the radio unit 12b via the radio working lines $14_{2W}$, $14_{4W}$. Further, when a fault has developed in one of the radio working lines $14_{1W}$~$14_{4W}$, the radio unit 12a transmits data, which has been accepted from the corresponding optical line, to the radio unit 12b via the radio standby line $14_P$, thereby relieving the failed radio working line.

The optical transmission lines $15_{1W}$~$15_{2P}$ are laid between the radio unit 12b and the optical transmission unit 11b. The optical transmission lines $15_{1W}$, $15_{2W}$ are the working lines and the optical transmission lines $15_{1P}$, $15_{2P}$ are the standby lines. The standby lines $15_{1P}$, $15_{2P}$ become the working lines when failures develop in the currently working lines $15_{1W}$, $15_{2W}$, respectively. The radio unit 12b (1) sends the optical working line $15_{1W}$ data accepted from the first radio working line $14_{1W}$ or from the radio standby line $14_P$ (at the time of failure); (2) sends the optical standby line $15_{1P}$ data accepted from the second radio working line $14_{2W}$ or from the radio standby line $14_P$ (at the time of failure); (3) sends the optical working line $15_{2W}$ data accepted from the third radio working line $14_{3W}$ or from the radio standby line $14_P$ (at the time of failure); and (4) sends the optical standby line $15_{2P}$ data accepted from the fourth radio working line $14_{4W}$ or from the radio standby line $14_P$ (at the time of failure).

In FIG. 22, only two pairs of the optical working lines and optical standby lines are provided. However, N (≧2) pairs are provided ordinarily. More specifically, the optical lines consist of N pairs of optical working lines and optical standby lines. The radio lines have radio working lines corresponding to the N-number of optical working lines and N-number of radio standby lines as well as one radio standby line.

In accordance with this SDH network, the transmission efficiency of the radio section is lower than that of the first arrangement described above but the reliability of the network is enhanced.

FIG. 23 illustrates a third example of the arrangement of an SDH network in which a radio transmission line is introduced into an optical transmission line. In this case radio transmission is performed without terminating the redundant lines of the optical transmission line. The network includes the optical transmission units 11a, 11b, the radio units 12a, 12b as well as optical transmission units 16a, 16b.. The optical transmission lines $13_{1W}$~$13_{2P}$ are laid (1) between the optical transmission unit 11a and the radio unit 12a and (2) between the optical transmission unit 11a and the optical transmission unit 16a. The optical transmission lines $13_{1W}$, $13_{2W}$ are the working lines and the optical transmission lines $13_{1P}$, $13_{2P}$ are the standby lines. The standby lines $13_{1P}$, $13_{2P}$ become the working lines when failures develop in the currently working lines $13_{1W}$, $13_{2W}$, respectively. Identical data is transmitted on the currently working lines and standby lines. The optical working line $13_{2W}$ and optical standby line $13_{1P}$ are connected to the radio unit 12a, and the optical working line $13_{1W}$ and optical standby line $13_{2P}$ are connected to the optical transmission unit 16a.

The radio working lines $14_{1W}$, $14_{2W}$ are provided in correspondence with the optical standby line $13_{1P}$ and optical working line $13_{2W}$, respectively. Numeral $14_P$ represents the single radio standby line. The radio unit 12a transmits data from the optical standby line $13_{1P}$ and optical working line $13_{2W}$ to the radio unit 12b via the radio working lines $14_{1W}$, $14_{2W}$. Further, when a fault has developed in one of the radio working lines $14_{1W}$, $14_{2W}$, the radio unit 12a transmits data, which has been accepted from the optical line corresponding to the radio working line that failed, to the radio unit 12b via the radio standby line $14_P$, thereby relieving the failed radio working line.

Optical transmission lines $17_W$, $17_P$ are laid between the optical transmission unit 16a and the optical transmission unit 16, namely in parallel with the radio transmission lines. The line $17_W$ is an optical working line provided to correspond to the optical working line $13_{1W}$, and the line $17_P$ is an optical standby line provided to correspond to the optical standby line $13_{2P}$. The optical transmission unit 16a transmits data from the optical working line $13_{1W}$ and optical standby line $13_{2P}$ to the optical transmission unit 16b via the optical lines $17_W$, $17_P$.

The optical transmission lines $15_{1W}$~$15_{2P}$ are laid (1) between the optical transmission unit 11b and the radio unit 12b and (2) between the optical transmission unit 11b and the optical transmission unit 16b. The optical transmission lines $15_{1W}$, $15_{2W}$ are the working lines and the optical transmission lines $15_{1P}$, $15_{2P}$ are the standby lines. The standby lines $15_{1P}$, $15_{2P}$ become the working lines when failures develop in the currently working lines $15_{1W}$, $15_{2W}$, respectively. Identical data is transmitted on the working lines and standby lines. The optical working line $15_{2W}$ and optical standby line $15_{1P}$ are connected to the radio unit 12ba, and the optical working line $15_{1W}$ and optical standby line $15_{2P}$ are connected to the optical transmission unit 16a.

The radio unit 12b (1) sends the optical standby line $15_{1P}$ data accepted from the first radio working line $14_{1W}$ or from the radio standby line $14_P$ (at the time of failure), and (2) sends the optical working line $15_{2W}$ data accepted from the second radio working line $14_{2W}$ or from the radio standby line $14_P$ (at the time of failure). The optical transmission unit 16b (1) sends the optical working line $15_{1W}$ data accepted from the optical working line $17_W$, and (2) sends the optical standby line $15_{2P}$ data accepted from the optical standby line $17_P$.

In FIG. 23, only two pairs of the optical working lines and optical standby lines are provided. However, N ($\geq$2) pairs are provided ordinarily. The radio lines consist of 2n-number of radio working lines corresponding to the n (<N) optical working lines and n optical standby lines, as well as one radio standby line. The transmission lines provided in parallel with the radio lines have (N-n)-number of optical working lines and (N-n)-number of optical standby lines.

In accordance with this SDH network, network reliability can be improved over that of the second arrangement described above but higher construction costs are entailed because it is necessary to lay optical transmission lines in parallel with the radio lines.

Thus, a redundant configuration is adopted in which one channel among (M+1)-number of channels in a radio section is used as a standby line and this standby line is shared by the working lines on the remaining M-number of channels. The changeover between working and standby lines in the radio section is performed based upon parity added on uniquely in the radio section. The parity is, say, the byte B1 (see FIG. 18) in the repeater section overhead. When parity error has occurred at a rate greater than a set rate, a failure is judged to have occurred and a changeover trigger is generated to perform the changeover between working and standby lines. For example, in the SDH network of FIG. 21, (1) when the radio unit 12b detects the occurrence of failure in the radio working line $14_{1W}$, (2) the radio unit 12b is placed in a state in which it is capable of receiving data from both the radio working line $14_{1W}$ and the radio standby line $14_P$. Next, (3) the radio unit 12b instructs the radio unit 12a, via an incoming standby line (not shown), to perform the working/standby changeover between the radio working line $14_{1W}$ and the radio standby line $14_P$. (4) In response to the changeover command, the radio unit 12a performs the working/standby changeover of the lines in sync with a synchronizing signal and transmits data via the standby line $14_P$. (5) Thereafter, the radio unit 12b adopts the old standby line $14_P$ as the working line, accepts data from this line and transmits the data to the optical lines $15_{1W}$, $13_{1P}$.

FIG. 24 is a diagram showing the configuration of a working/standby changeover controller, used when a failure develops in a radio line, in the radio unit 12b. The controller includes a priority setting unit 18a for setting the relief priority of radio working lines, a radio failure detector 18b for detecting failure in each of the radio working lines, a relieved-line decision unit 18c which, when failure has occurred in two or more radio working lines simultaneously or in succession, refers to the set relief priority and relieves the radio working line having the highest priority, and a line changeover control unit 18d for controlling changeover between the radio working line, which has been decided by the relief line decision unit 18c, and the radio standby line. If there is only one radio working line that has failed, the relief line decision unit 18c relieves this line even if its priority is low.

In the prior art, the order of priority of relief in a case where a plurality of lines have failed in a radio section is fixed or is the order in which the failures occurred. In other words, the prior art is such that relief of a radio line that has developed a fault is performed without giving any consideration to the redundant configuration of the optical transmission lines or the state of failure occurrence in the transmission lines.

However, when the conventional relief method is considered in terms of the overall network, there are many instances in which the method is not efficient. For example, with the conventional relief method, there are occasions where a line that should be relieved early on is not relieved whereas a line whose relief may be deferred to a later time is relieved first. In such case data communication cannot be carried out in a line exhibiting the worst conditions. This will be described in detail with reference to FIG. 21. Assume a situation in which the optical lines $13_{1W}$, $13_{1P}$ open due to a failure of some kind, thereby interrupting line service, under which condition a radio failure occurs in the radio working line $14_{1W}$ and then in the radio working line $14_{2W}$. According to the prior art in such case, the working/standby changeover is performed between the radio working line $14_{1W}$, which developed the radio failure first, and the radio standby unit $14_P$, thereby relieving the radio working line $14_{1W}$ and not the radio working line $14_{2W}$. With this method, however, data communication becomes impossible on all lines. If radio working line $14_{2W}$ were to have been relieved, communication of data from the optical line $13_{2W}$ would become possible. Though the foregoing is for a case in which relief is performed in the order in which failure occurs, the results would be the same also in a case where the order of relief priority is fixed.

An example of another problem will be described with reference to FIG. 22. Assume that a radio failure has developed in the radio working line $14_{2W}$ and then in the radio working line $14_{1W}$. According to the prior art in such case, the working/standby changeover is performed between the radio working line $14_{2W}$, which developed the radio failure first, and the radio standby unit $14_P$, thereby relieving the radio working line $14_{2W}$ and not the radio working line $14_{1W}$. In other words, in a case where radio failures occur in radio working lines corresponding to an optical working line and optical standby line, the conventional method is such that a situation arises in which the radio working line corresponding to the optical standby line is relieved but not the radio working line corresponding to the more important optical working line.

Further, in a case where a radio failure occurs simultaneously in the radio working lines $14_{2W}$, $14_{4W}$ corresponding to the two optical standby lines $13_{1P}$, $13_{2P}$, the conventional method relieves whichever radio working line developed the failure first. When the line conditions of the optical working line $13_{1W}$ and optical working line $13_{2W}$ are compared, it is found that there is a case in which the likelihood is high that the working/standby changeover will be performed because the line condition of the optical working line $13_{2W}$ is poor. In such case the radio working line $14_{4W}$ corresponding to the optical standby line $13_{2P}$ should be relieved at a higher priority that the radio working line $14_{2W}$ corresponding to the optical standby line $13_{1P}$. With the conventional method, however, the radio working line $14_{2W}$ corresponding to the optical standby line $13_{1P}$ is relieved but not the radio working line $14_{4W}$ corresponding to the optical standby line $132_{1P}$.

SUMMARY OF THE INVENTION

Accordingly, a first object of the present invention is to relieve a radio line upon taking into consideration the redundant configuration of an optical transmission line or the state of failure occurrence in the optical transmission line.

A second object of the present invention is to lower the rank for relief of a radio line corresponding to a faulty optical line and to give priority to the relief of a radio line corresponding to an optical line that is not faulty.

A third object of the present invention is to give a higher priority to the relief of a radio line corresponding to an optical working line than to a radio line corresponding to an optical standby line.

A fourth object of the present invention is to give a higher priority to the relief of a radio line corresponding to an optical standby line of an optical working line having an unsatisfactory line condition than to a radio line corresponding to an optical standby line of an optical working line having a satisfactory line condition.

According to the present invention, the first and second objects of the present invention are attained by providing a method of relieving a radio line in an SDH network comprising the steps of providing radio working lines to correspond to respective ones of optical lines and providing one radio standby line; monitoring occurrence of failure in each optical line and occurrence of failure in the radio working lines; when occurrence of a failure in an optical line has been detected, making rank for relief of the radio working line corresponding to this optical line lower than rank for relief of radio working lines corresponding to optical lines that have not failed; and when a failure has occurred in two or more radio working lines, transmitting data, which is to be sent to a radio working line having a higher rank for relief, via the radio standby line and relieving the radio working lines in which the failure has occurred.

According to the present invention, the first and third objects of the present invention are attained by providing a method of relieving a radio line in an SDH network comprising the steps of providing radio working lines to correspond to respective ones of plural sets of optical working lines and optical standby lines and providing one radio standby line; making rank for relief of radio working lines corresponding to optical working lines higher than rank for relief of radio working lines corresponding to optical standby lines; monitoring occurrence of failure in each radio working line; and when a failure has occurred in two or more radio working lines, transmitting data, which is to be sent to a radio working line having a higher rank for relief, via the radio standby line and relieving the radio working lines in which the failure has occurred.

According to the present invention, the first and fourth objects of the present invention are attained by providing a method of relieving a radio line in an SDH network comprising the steps of providing radio working lines to correspond to respective ones of plural sets of optical working lines and optical standby lines and providing one radio standby line; monitoring line condition in each optical working line; monitoring occurrence of failure in radio working lines; making rank for relief of a radio working line corresponding to an optical standby line in a pair with an optical working line having an unsatisfactory line condition higher than rank for relief of radio working lines corresponding to optical standby lines in pairs with optical working lines having a satisfactory line condition; and when a failure has occurred in two or more radio working lines, transmitting data, which is to be sent to a radio working line having a higher rank for relief, via the radio standby line and relieving the radio working lines in which the failure has occurred.

Other features and advantages of the present invention will be apparent from the following description taken in conjunction with the accompanying drawings.

BRIEF DESCRIPTION OF THE DRAWINGS

FIGS. 10A, 10B, 10C and 10D are views for describing interfaces;

FIG. 18 is a diagram for describing multiplex section overhead and repeater section overhead;

DESCRIPTION OF THE PREFERRED EMBODIMENTS (A) Overview of the Invention

Figure 1:
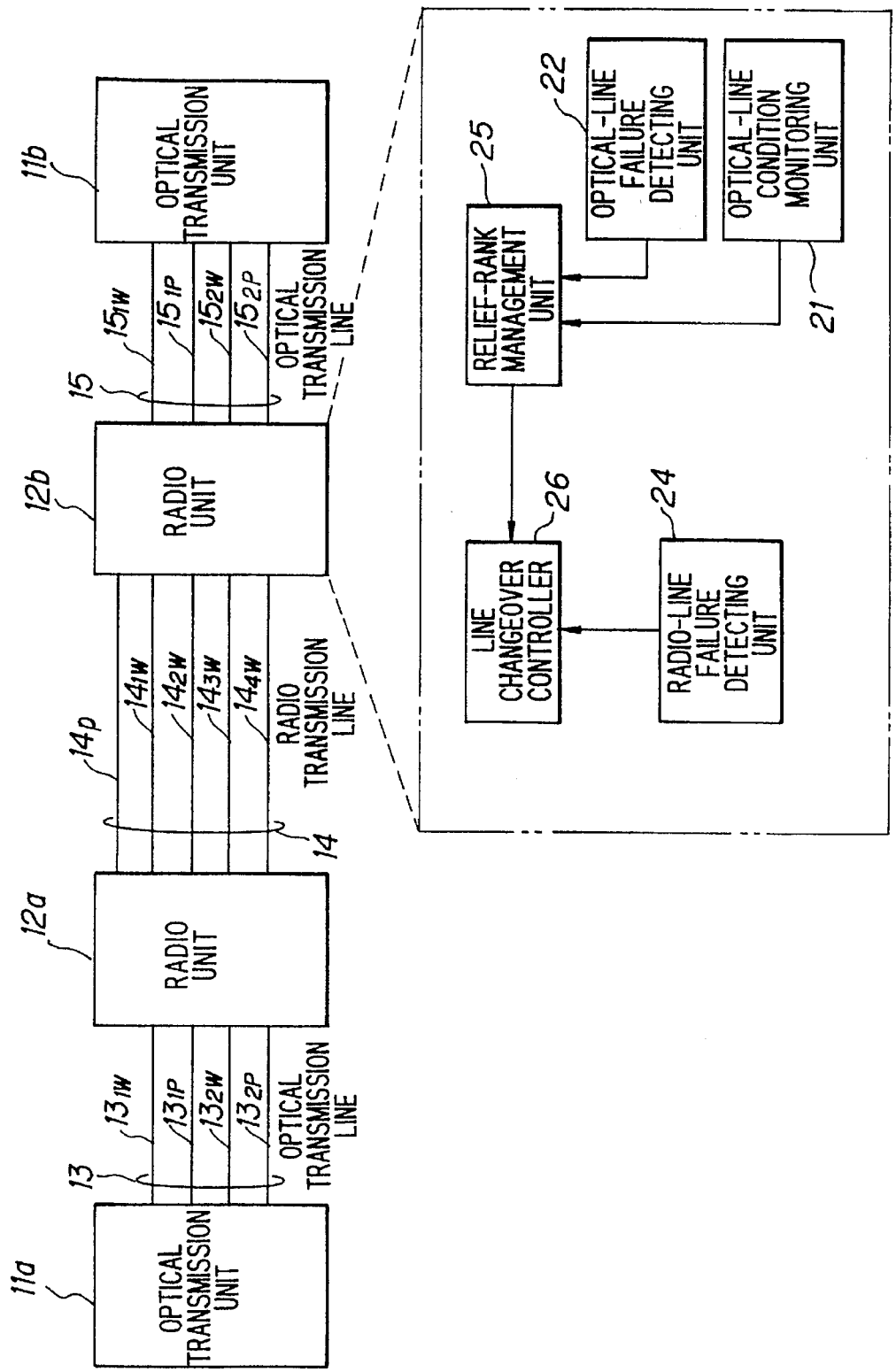
FIG. 1 is a block diagram for describing the principles of the present invention.

FIG. 1 is a block diagram for describing the principles of the present invention. Shown in FIG. 1 are the optical transmission units 11a, 11b, the radio units 12a, 12b and optical transmission lines 13, 15. The optical transmission line 13 has plural sets of optical working lines $13_{1W}$, $13_{2W}$ and optical standby lines $13_{1P}$, $13_{2P}$, and the optical transmission line 15 has plural sets of optical working lines $15_{1W}$, $15_{2W}$ and optical standby lines $15_{1P}$, $15_{2P}$. A radio transmission line 14, which is introduced between the optical transmission lines 13 and 15, has radio working lines $14_{1W}$~$14_{4W}$ corresponding to respective ones of the optical working lines $13_{1W}$, $13_{2W}$ and optical standby lines $13_{1P}$, $13_{2P}$, as well as one radio standby line $14_P$.

The radio unit 12b on the receiving end includes monitoring means (an optical-line condition monitoring unit) 21 for detecting the line condition in each optical line, detecting means (an optical-line failure detecting unit) 22 for detecting occurrence of failure in each optical line, second detecting means (a radio-line failure detecting unit) 24 for detecting occurrence of failure in each radio working line, a relief-rank management unit 25 for managing rank of relief for radio working lines, and a line changeover controller 26 which, when a failure has developed in two or more radio working lines, transmits data, which is to be sent to a radio working line having a higher rank for relief, via the radio standby line $14_P$.

(a) First Operation of the Invention

The radio working lines $14_{1W}$~$14_{4W}$ are provided to correspond to prescribed optical lines and the single radio standby line $14_P$ is provided, these lines serving as the radio lines 14. The occurrence of failure in each of the optical lines is monitored by the optical-line failure detecting unit 22, and the occurrence of failure in each of the radio working lines is monitored by the radio-line failure detecting unit 24. When occurrence of a failure in an optical line has been detected, the relief-rank management unit 25 makes the rank for relief of the radio working line corresponding to this optical line lower than the rank for relief of radio working lines corresponding to optical lines that have not failed. When a failure has occurred in two or more radio working lines, the line changeover controller 26 changes over between working/standby of a radio working line having a higher rank for relief and the radio standby line $14_P$, and transmits data, which is to be sent to a radio working line that failed, via the radio standby line $14_P$. If this arrangement is adopted, the rank for relief of a radio line corresponding to a faulty optical line is lowered and priority can be given to relief of a radio line corresponding to an optical line that is not faulty. In other words, a radio line can be relieved upon giving consideration to the state of failure occurrence in the optical transmission line.

(b) Second Operation of the Invention

N-number of pairs of optical working lines $13_{1W}$~$13_{2W}$ and optical standby lines $13_{1P}$~$13_{2P}$ are provided as the optical transmission line 13. Radio working lines $14_{1W}$~$14_{4W}$ are provided to correspond to respective ones of n ($\leq$N)-number of optical working lines and n-number of optical standby lines, and the single radio standby line $14_P$ is provided, these lines serving as the radio lines 14. The relief-rank management unit 25 makes the rank for relief of radio working lines $14_{1W}$, $14_{3W}$ corresponding to optical working lines higher than the rank for relief of radio working lines $14_{2W}$, $14_{4W}$ corresponding to optical standby lines. The radio-line failure detecting unit 24 monitors occurrence of failure in each radio working line. When a failure has occurred in two or more radio working lines, the line changeover controller 26 changes over between working/standby of a radio working line having a higher rank for relief and the radio standby line $14_P$, and transmits data, which is to be sent to a radio working line that failed, via the radio standby line $14_P$. If this arrangement is adopted, it is possible to give a higher priority to the relief of a radio line corresponding to an optical working line than to a radio line corresponding to an optical standby line. In addition, it is possible to relieve a radio line upon taking into consideration the redundant configuration of the optical transmission line. Further, it is so arranged that if n<N holds, data from (N-n)-number of optical radio lines and (N-n)-number of optical standby lines is transmitted via optical transmission lines provided in parallel with radio transmission lines. If this arrangement is adopted, the reliability of the network can be improved.

(c) Third Operation of the Invention

The radio working lines $14_{1W}$~$14_{4W}$ are provided to correspond to respective ones of the optical working lines $13_{1W}$~$13_{2W}$ and optical standby lines $13_{1P}$~$13_{2P}$, and the single radio standby line $14_P$ is provided, these lines serving as the radio lines 14. The line condition in each of the optical working lines is monitored by the optical-line condition monitoring unit 21, and the occurrence of failure in each of the radio working lines is monitored by the radio-line failure detecting unit 24. The relief-rank management unit 25 makes the rank for relief of a radio working line corresponding to an optical standby line in a pair with an optical working line having an unsatisfactory line condition higher than the rank for relief of radio working lines corresponding to optical standby lines in pairs with optical working lines having a satisfactory line condition. When a failure has occurred in two or more radio working lines, the line changeover controller 26 changes over between working/standby of a radio working line having a higher rank for relief and the radio standby line $14_P$, and transmits data, which is to be sent to a radio working line that failed, via the radio standby line $14_P$. If this arrangement is adopted, it is possible to give a higher priority to the relief of a radio line corresponding to an optical standby line in a pair with an optical working line in an unsatisfactory condition than to a radio line corresponding to an optical standby line in a pair with an optical working line in a satisfactory condition. In other words, a radio line can be relieved upon giving consideration to the line condition of in the optical transmission line.

(d) Fourth Operation of the Invention

N-number of pairs of optical working lines $13_{1W}$~$13_{2W}$ and optical standby lines $13_{1P}$~$13_{2P}$ are provided as the optical transmission line 13. Radio working lines $14_{1W}$~$14_{4W}$ are provided to correspond to respective ones of n ($\leq$N)-number optical working lines and n-number of optical-standby lines, and the single radio standby line $14_P$ is provided, these lines serving as the radio lines 14. The occurrence of failure in each of the optical lines is monitored by the optical-line failure detecting unit 22, and the occurrence of failure in each of the radio working lines is monitored by the radio-line failure detecting unit 24. (1) The relief-rank management unit 25 makes the rank for relief of radio working lines corresponding to optical working lines higher than the rank for relief of radio working lines corresponding to optical standby lines. (2) When occurrence of failure has been detected in an optical working line, the relief-rank management unit 25 makes the rank for relief of the radio working line corresponding to this optical working line lower than rank for relief of radio working lines corresponding to optical working lines that have not failed. (3) When occurrence of failure has been detected in an optical standby line, the relief-rank management unit 25 makes the rank for relief of the radio working line corresponding to this optical standby line lower than rank for relief of radio working lines corresponding to optical standby lines that have not failed. When a failure has occurred in two or more radio working lines, the line changeover controller 26 changes over between working/standby of a radio working line having a higher rank for relief and the radio standby line $14_P$, and transmits data, which is to be sent to a radio working line that failed, via the radio standby line $14_P$. If this arrangement is adopted, it is possible to relieve a radio line upon taking into consideration both the redundant configuration of the optical transmission line and the state of failure occurrence in the optical transmission line.

(e) Fifth Operation of the Invention

The radio working lines $14_{1W}$~$14_{4W}$ are provided to correspond to respective ones of the optical working lines $13_{1W}$~$13_{2W}$ and optical standby lines $13_{1P}$~$13_{2P}$, and the single radio standby line $14_P$ is provided, these lines serving as the radio lines 14. The line condition in each of the optical working lines is monitored by the optical-line condition monitoring unit 21, and the occurrence of failure in each of the radio working lines is monitored by the radio-line failure detecting unit 24. The relief-rank management unit 25 (1) makes the rank for relief of radio working lines corresponding to optical working lines higher than the rank for relief of radio working lines corresponding to optical standby lines, and (2) makes the rank for relief of a radio working line corresponding to an optical standby line in a pair with an optical working line having an unsatisfactory line condition higher than the rank for relief of radio working lines corresponding to optical standby lines in pairs with optical working lines having a satisfactory line condition. When a failure has occurred in two or more radio working lines, the line changeover controller 26 changes over between working/standby of a radio working line having a higher rank for relief and the radio standby line $14_P$, and transmits data, which is to be sent to a radio working line that failed, via the radio standby line $14_P$. If this arrangement is adopted, it is possible to relieve a radio line upon taking into consideration both the redundant configuration of the optical transmission line and the state of failure occurrence in the optical transmission line.

(f) Sixth Operation of the Invention

The radio working lines $14_{1W}$~$14_{4W}$ are provided to correspond to respective ones of the optical working lines $13_{1W}$~$13_{2W}$ and optical standby lines $13_{1P}$~$13_{2P}$, and the single radio standby line $14_P$ is provided, these lines serving as the radio lines 14. The optical-line condition monitoring unit 21 monitors the line condition in each of the optical working lines, and the radio-line failure detecting unit 24 monitors the occurrence of failure in each of the radio working lines. (1) The relief-rank management unit 25 makes the rank for relief of radio working lines corresponding to optical working lines higher than the rank for relief of radio working lines corresponding to optical standby lines. (2) When occurrence of failure has been detected in an optical working line, the relief-rank management unit 25 makes the rank for relief of the radio working line corresponding to this optical working line lower than rank for relief of radio working lines corresponding to optical working lines that have not failed. (3) When occurrence of failure has been detected in an optical standby line, the relief-rank management unit 25 makes the rank for relief of the radio working line corresponding to this optical standby line lower than rank for relief of radio working lines corresponding to optical standby lines that have not failed. (4) The relief-rank management unit 25 makes the rank for relief of a radio working line corresponding to an optical standby line in a pair with an optical working line having an unsatisfactory line condition higher than the rank for relief of radio working lines corresponding to optical standby lines in pairs with optical working lines having a satisfactory line condition. When a failure has occurred in two or more radio working lines, the line changeover controller 26 changes over between working/standby of a radio working line having a higher rank for relief and the radio standby line $14_P$, and transmits data, which is to be sent to a radio working line that failed, via the radio standby line $14_P$. If this arrangement is adopted, it is possible to relieve a radio line upon taking into consideration the redundant configuration of the optical transmission line, the line condition of the optical transmission line and the state of failure occurrence in the optical transmission line.

(B) First Embodiment of the Invention

Figure 2:
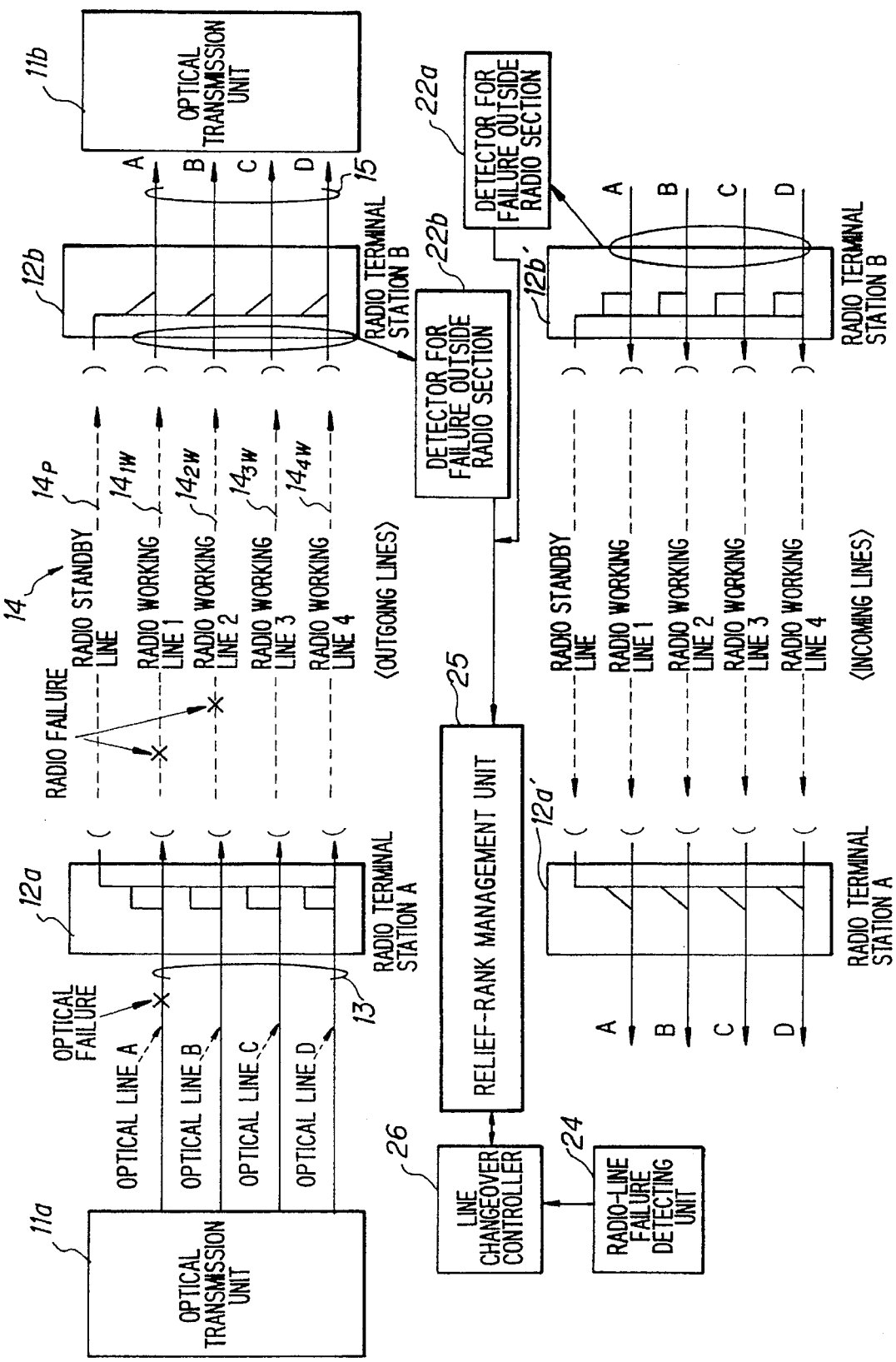
FIG. 2 is a diagram for describing a method of relieving radio lines according to a first embodiment of the present invention.

FIG. 2 is a diagram for describing a method of relieving radio lines in an SDH network according to a first embodiment of the present invention. According to the first embodiment, a radio line corresponding to an optical line that is not faulty is relieved at a priority higher than that of a radio line corresponding to a faulty optical line. It should be noted that the first embodiment is applicable to the SDH networks shown in FIGS. 21~23.

Figure 21:
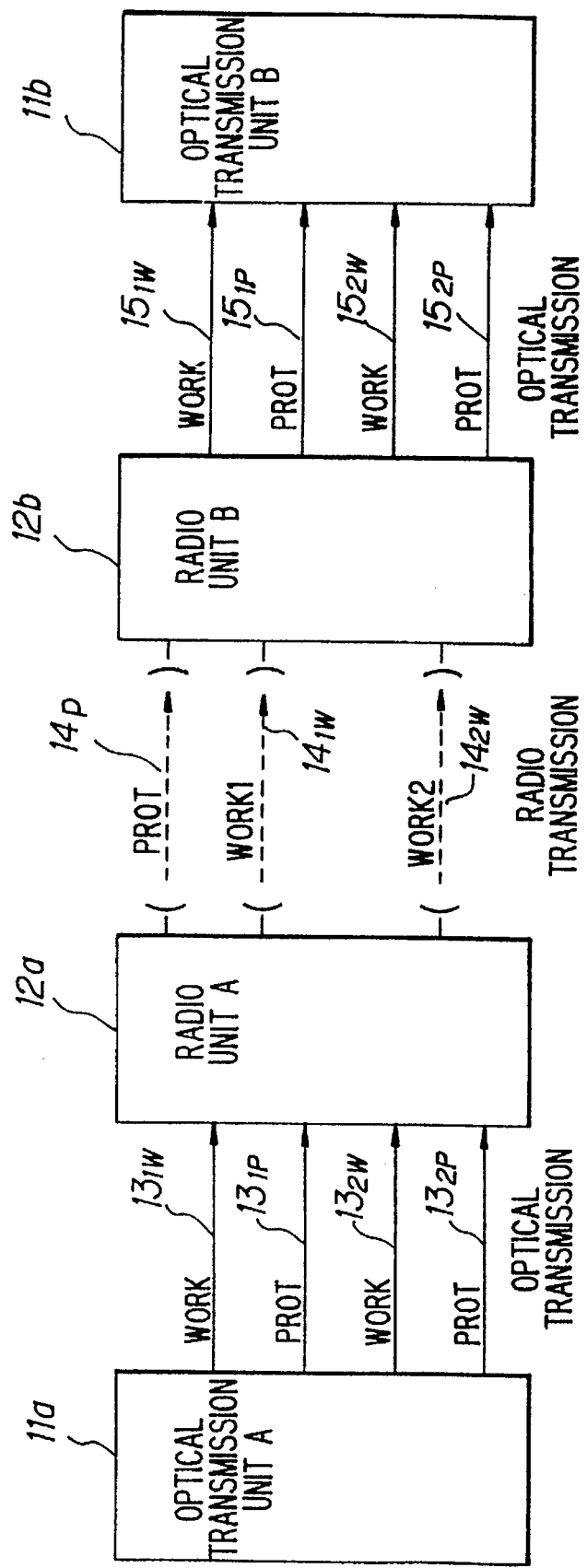
FIG. 21 is a diagram showing a first arrangement of an SDH network in which a radio transmission line is introduced between optical transmission lines.
Figure 22:
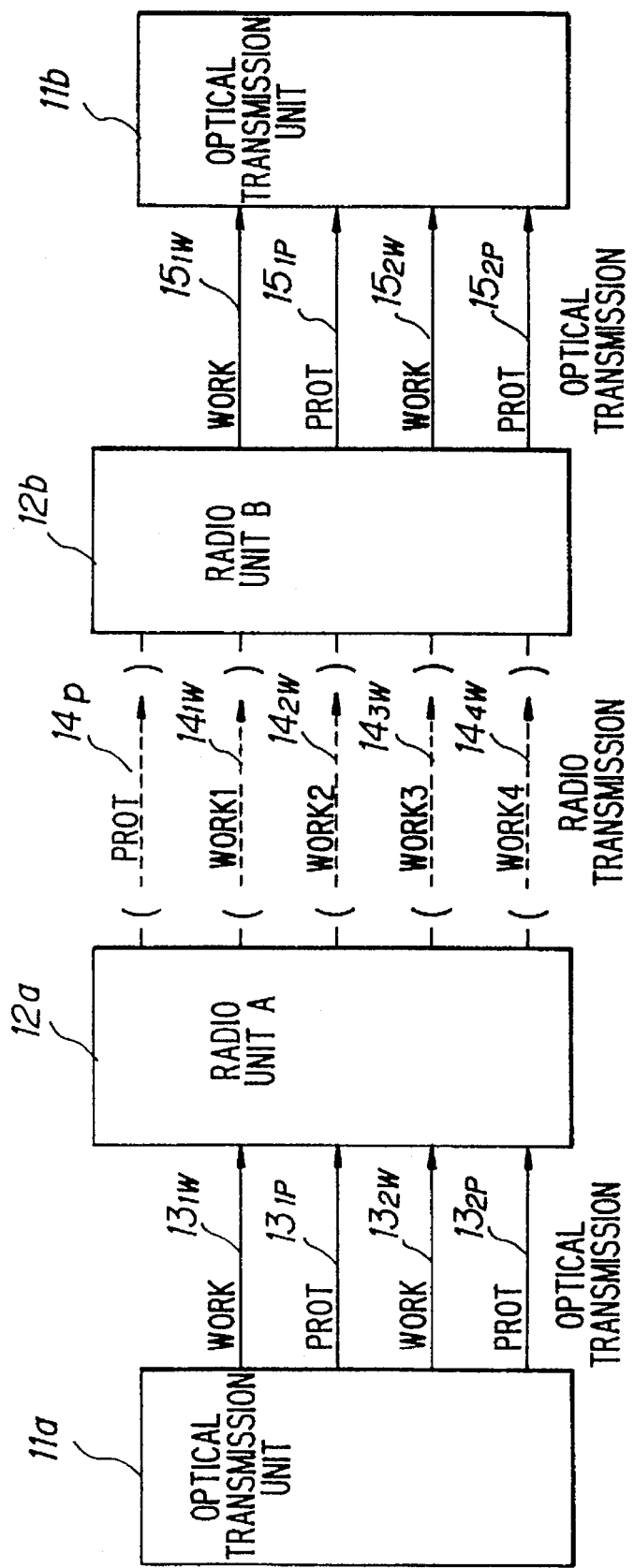
FIG. 22 is a diagram showing a second arrangement of an SDH network in which a radio transmission line is introduced between optical transmission lines.
Figure 23:
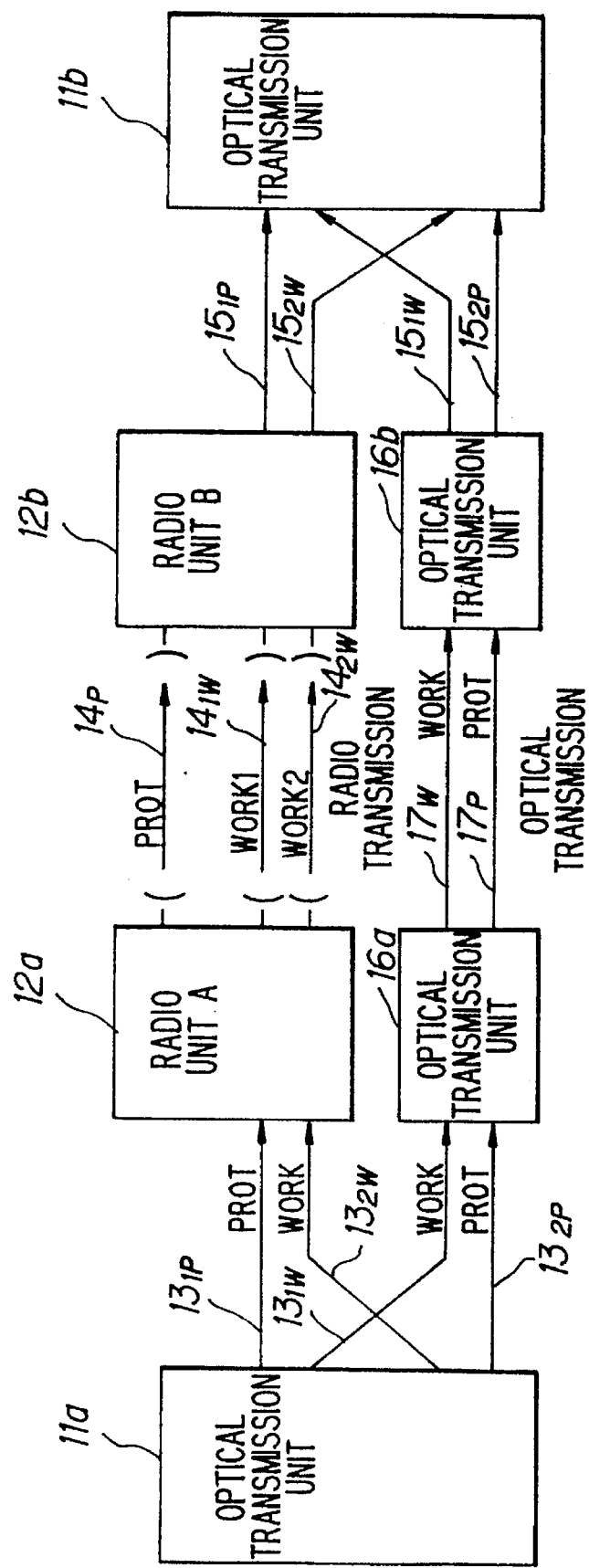
FIG. 23 is a diagram showing a third arrangement of an SDH network in which a radio transmission line is introduced between optical transmission lines.
Figure 24:
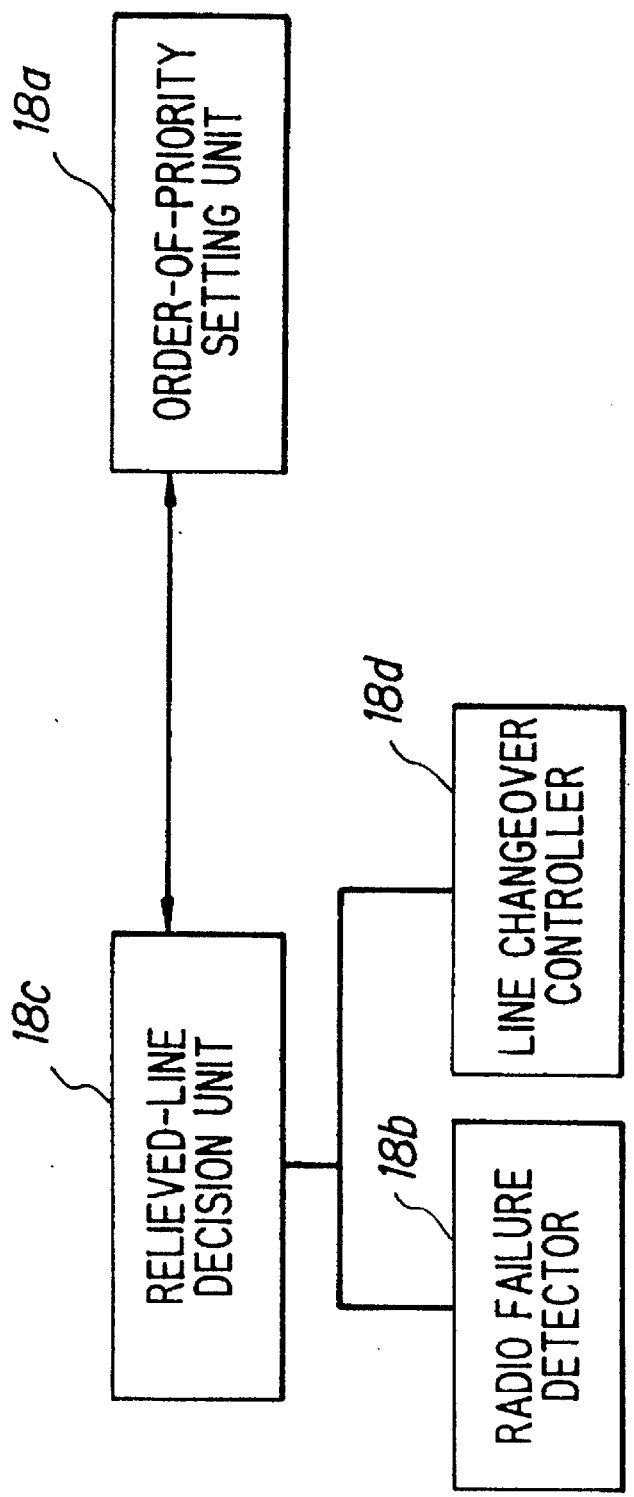
FIG. 24 is a diagram showing the configuration of a working/standby changeover controller used when a failure develops in a radio line.

Shown in FIG. 2 are the optical transmission units 11a, 11b, radio units (terminal stations A) 12a, 12a' and radio units (terminal stations B) 12b, 12b'. The radio terminal stations 12a, 12b administer radio transmission/reception control of outgoing lines, and the radio terminal stations 12a', 12b' administer radio transmission/reception control of incoming lines. The optical transmission lines 13, 15 each have lines A~D. In the case of FIGS. 21~23, the optical lines A, C correspond to the optical working lines $13_{1W}$, $13_{2W}$; $15_{1W}$, $15_{2W}$, and the optical lines B, D correspond to the optical working lines $13_{1P}$, $13_{2P}$; $15_{1P}$, $15_{2P}$. The radio transmission line 14, which is introduced between the optical transmission lines 13 and 15, has radio working lines $14_{1W}$~$14_{4W}$ corresponding to respective ones of the optical working lines A~D and optical standby lines $13_{1P}$, $13_{2P}$, as well as one radio standby line $14_P$.

Detectors 22a, 22b detect failure outside the radio section, e.g., failure in the optical lines. The radio-line failure detecting unit 24 detects failure in the radio lines, the relief-rank management unit 25 manages rank of relief for the radio lines, and the line changeover controller 26 performs line changeover. These units are provided in the radio terminal station B.

Figures 19, 20:
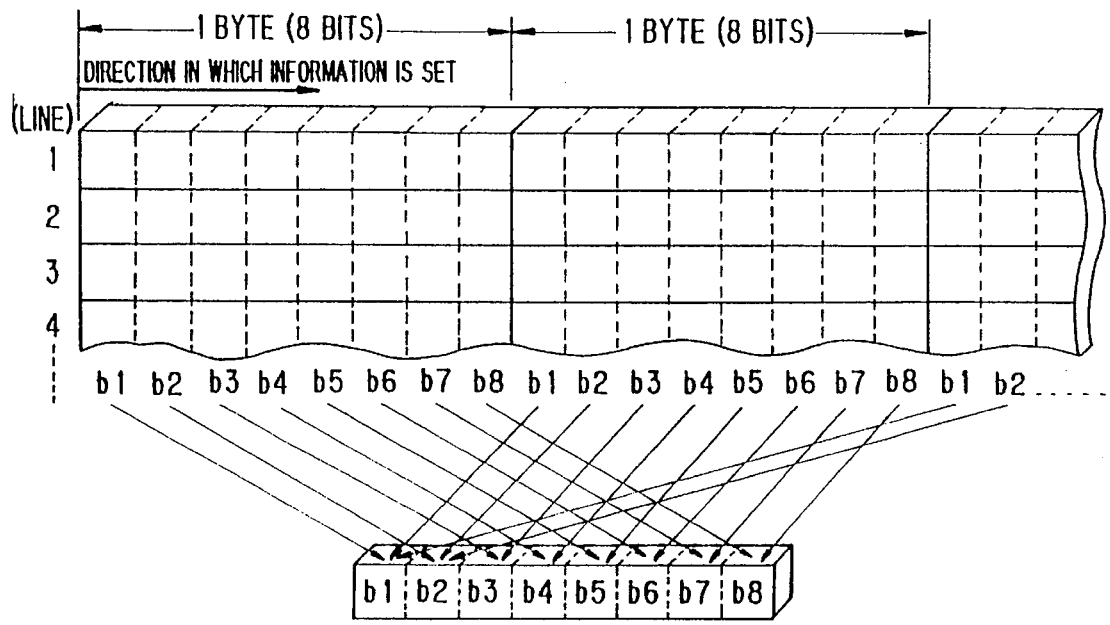
FIG. 19 is a diagram for describing the definitions of bytes K1 and K2.
FIG. 20 is a diagram for describing BIP.

The detector 22a detects failure which has occurred outside the radio section, namely failure which has occurred in the optical lines A~D. For example, when a failure develops in optical line A, the optical transmission unit 11b on the receiving side sends the incoming A line a FERF (far end receive failure) signal indicating that a signal sent by the optical transmission unit 11a on the transmitting side has not arrived. The FERF signal is sent using the bits b6~b8 of the K2 byte in the multiplex section overhead (see FIGS. 18 and 19). The detector 22a of the radio terminal station 12b' accepts the K2 byte on each incoming line and detects the FERF signal on the A line.

The detector 22b detects a failure that has occurred ahead of the optical transmission unit 11a. In a case where the location of the fault resides ahead of the optical transmission unit 11a, an MS-AIS (multiple section alarm indication signal) is sent in using the bits b6~b8 of the K2 byte. The detector 22b detects this MS-AIS signal, thereby detecting the occurrence of failure outside the radio section. Further, the detector 22b performs a parity check based upon the B2 byte and detects a B2 alarm, thereby detecting the occurrence of failure outside the radio section.

When occurrence of a failure in a line outside the radio section has been detected by the detectors 22a, 22b, the relief-rank management unit 25 makes the rank for relief of the radio working line corresponding to this line lower than rank for relief of radio working lines corresponding to lines that have not failed, thereby updating the order of priority for relief. The radio-line failure detecting unit 24 accepts the B1 byte of the repeater section overhead (see FIG. 18) from each of the radio working lines $14_{1W} \sim 14_{4W}$ and performs a parity check, thereby detecting failure in each of the radio working lines. When a failure has occurred in two or more radio working lines, the line changeover controller 26 instructs the radio terminal station A, via the incoming standby line, to change over between working/standby of a radio working line having a higher rank for relief and the radio standby line $14_P$.

Figure 3:
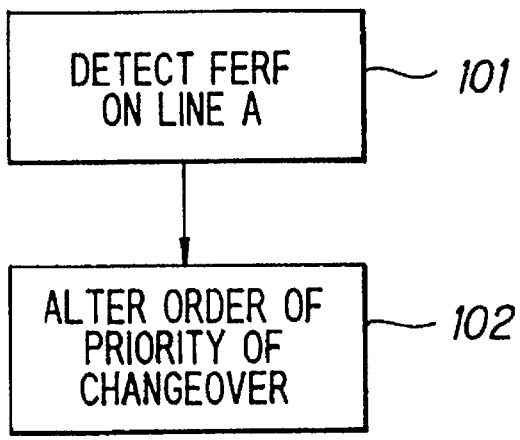
FIG. 3 is a flowchart of processing for setting relief priority.
Figure 4:
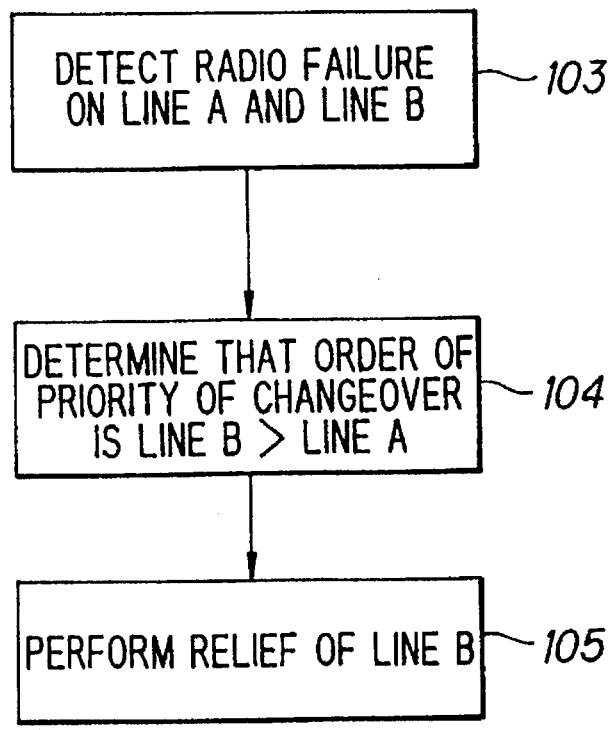
FIG. 4 is a flowchart of processing for line changeover.

FIG. 3 is a flowchart of processing for setting relief priority, and FIG. 4 is a flowchart of processing for line changeover. It will be assumed that a failure has occurred in optical line A and that a double failure has occurred in lines A and B in the radio section.

The detectors 22a, 22b for detecting optical line failure monitor the occurrence of failure in each optical line, and the radio-line failure detecting unit 24 monitors the occurrence of failure in the radio working lines. When a failure occurs in the optical line A, the detector 22a detects the FERF signal, recognizes the failure in line A and so notifies the relief-rank management unit (step 101). Upon being notified of the occurrence of failure in optical line A, the relief-rank management unit 25 makes the rank for relief of the radio working line $14_{1W}$ corresponding to the optical line A lower than rank for relief of the radio working lines $14_{2W} \sim 14_{4W}$ corresponding to optical lines B, C, D that have not failed (step 102).

When a failure has occurred in two or more radio lines A, B (radio working lines $14_{1W}$, $14_{2W}$) under these conditions, the radio-line failure detecting unit 24 detects the failure and so notifies the line changeover controller 26 (step 103).

In response to such notification, the line changeover controller 26 acquires the order of priority for relief of the radio lines A and B from the relief-rank management unit 25 and determines the fact that the order of priority for relief of radio line B is higher than that for relief of radio line A (step 104). As a result, the line changeover controller 26 instructs the radio terminal station 12a', via the incoming standby line, to change over between working/standby of the radio line B (radio working line $14_{2W}$) having the higher rank for relief and the radio standby line $14_P$. The radio terminal station 12a performs the changeover between working/standby of the designated radio line B and the radio standby line $14_P$ and transmits data, which is to be sent to the radio line B that failed, via the radio standby line $14_P$ (step 105).

It should be noted that if only one radio line has failed, the radio line is relieved even if its priority is low. However, when a failure occurs simultaneously in another radio line having a high order of priority for relief, this other radio line is relieved.

Thus, in accordance with the first embodiment, the rank for relief of a radio line corresponding to a faulty optical line is lowered and priority can be given to relief of a radio line corresponding to an optical line that is not faulty.

(C) Second Embodiment of the Invention

Figure 5:
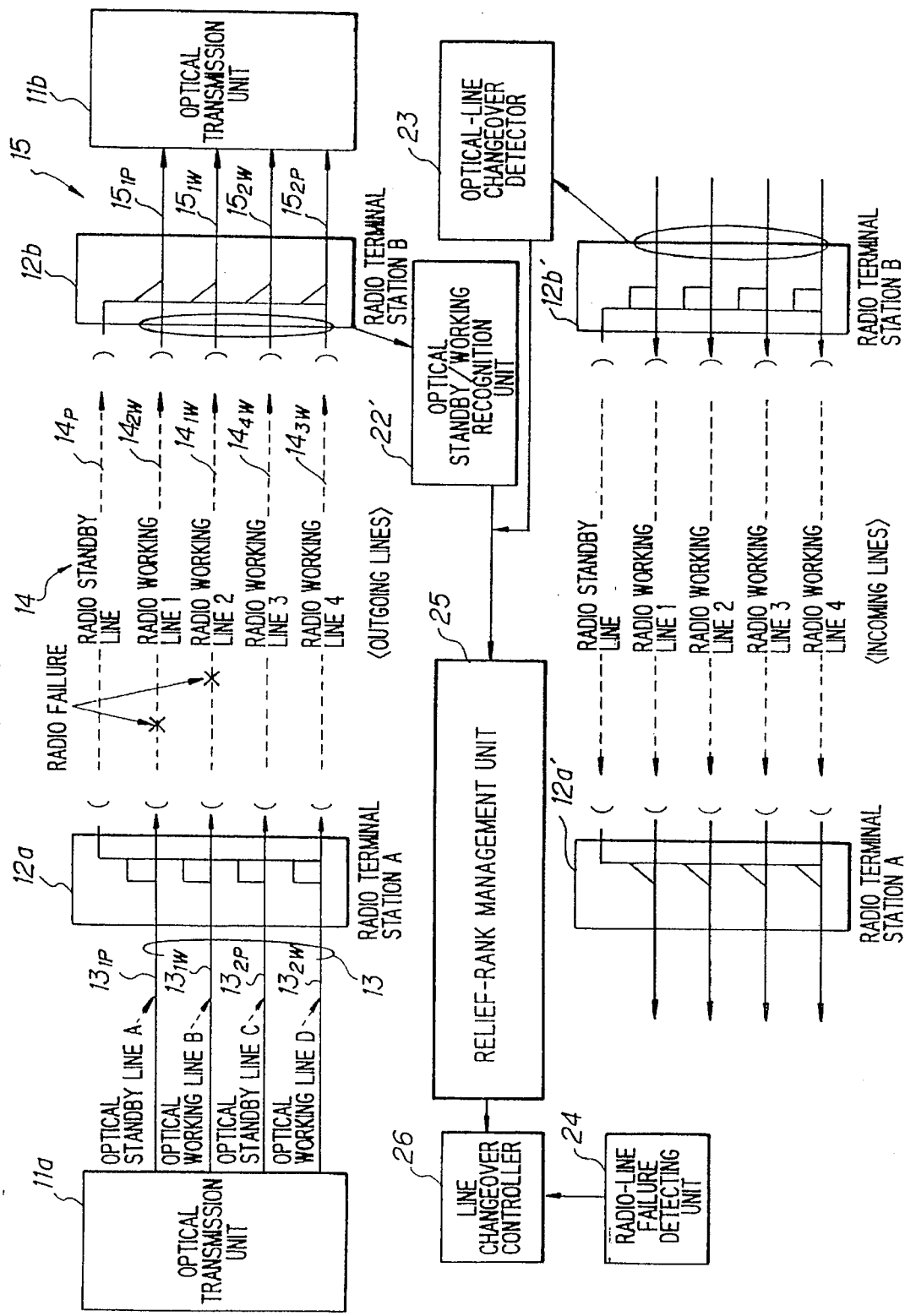
FIG. 5 is a diagram for describing a method of relieving radio lines according to a second embodiment of the present invention.

FIG. 5 is a diagram for describing a method of relieving radio lines in an SDH network according to a second embodiment of the present invention. According to the second embodiment, a higher priority is given to the relief of a radio line corresponding to an optical working line than to a radio line corresponding to an optical standby line. It should be noted that the second embodiment is applicable to the SDH networks shown in FIGS. 21~23.

Shown in FIG. 5 are the optical transmission units 11a, 11b, radio units (terminal stations A) 12a, 12a' and radio units (terminal stations B) 12b, 12b'. The radio terminal stations 12a, 12b administer radio transmission/reception control of outgoing lines, and the radio terminal stations 12a', 12b' administer radio transmission/reception control of incoming lines. The optical transmission line 13 has radio working lines $13_{1W}$, $13_{2W}$ and optical standby lines $13_{1P}$, $13_{2P}$, and the optical transmission line 15 has radio working lines $15_{1W}$, $15_{2W}$ and optical standby lines $15_{1P}$, $15_{2P}$. The optical working line $13_{iW}$ (i=1, 2, . . . ) and the optical standby line $13_{iP}$ form a pair. When a failure has occurred in an optical working line $13_{iW}$, a changeover is made between working/standby of the optical working line $13_{iW}$ and the optical standby line $13_{iP}$. The radio transmission line 14, which is introduced between the optical transmission lines 13 and 15, has radio working lines $14_{1W} \sim 14_{4W}$ corresponding to respective ones of the optical working lines $13_{1W}$, $13_{2S}$ and optical standby lines $13_{1P}$, $13_{2P}$, as well as one radio standby line $14_P$.

Numeral 22' denotes an optical standby/working recognition unit for determining whether a line is operating as a working line or as a standby line. An optical-line changeover detector 23 for detecting a working/standby changeover request. The radio-line failure detecting unit 24 detects failure in the radio lines, the relief-rank management unit 25 manages rank of relief for the radio lines, and the line changeover controller 26 performs line changeover. These units are provided in the radio terminal station B.

On the basis of the information indicated by the K2 byte (bits b1~b4) on an outgoing line and information, held as initially set information, indicating whether a line is working or standby (0010 indicating a working line and 0001 indicating a standby line), the optical standby/working recognition unit 22' determines whether the line is operating as a standby line or as a working line and notifies the relief-rank management unit 25 of the results. For example, if the K2 byte (b1~b4) which arrives via the optical line A is 0010, then the line A is judged to be a working line. If the K2 byte (b1~b4) which arrives via the optical line A is 0001, then the line A is judged to be a standby line.

The optical-line changeover detector 23 refers to K1 (b1~b4) on the incoming lines, detects a working→standby, standby→working changeover request and notifies the relief-rank management unit 25.

On the basis of working/standby of optical lines A~D discriminated by the optical standby/working recognition unit 22', the relief-rank management unit 25 makes the order of priority for relief of radio working lines corresponding to optical working lines higher than the order of priority for relief of radio working lines corresponding to optical standby lines. More specifically, in the example of FIG. 5, the relief-rank management unit 25 makes the order of priority for relief of radio working lines $14_{1W}$, $14_{3W}$ corresponding to the optical working lines $13_{1W}$, $13_{2W}$ higher than the order of priority for relief of radio working lines $14_{2W}$, $14_{4W}$ corresponding to optical standby lines $13_{1P}$, $13_{2P}$. Further, when notification of detection of the optical-line working/standby changeover request is received from the optical-line changeover detector 23, the relief-rank management unit 25 changes the order of priority. For example, notification of the standby/working changeover of line A/line B is received, the relief-rank management unit 25 first changes the order of priority for relief of the lines A, B to the same level and establishes the following order of priority: standby line A→working line A, working line B→working line B). Next, the relief-rank management unit 25 verifies end of the changeover operation in accordance with (1), (2) below. Specifically, end of the changeover operation is verified based upon (1) reversal of the K2 byte (b1~b4) on the relevant outgoing lines A, B, and (2) disappearance of a changeover request code in the K1 byte (b1~b4) on the relevant incoming lines A, B. If end of the changeover operation is verified, the relief-rank management unit 25 changes the order of priority (working line A→working line A, working line B→standby line B).

Figure 6:
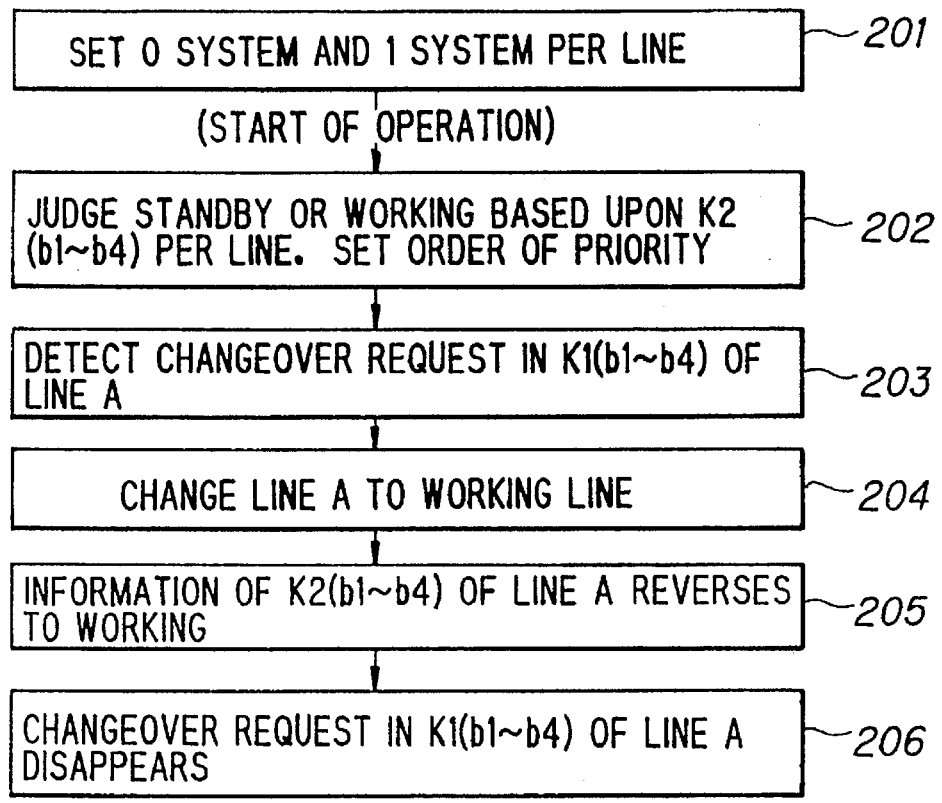
FIG. 6 is a flowchart of processing for setting relief priority.
Figure 7:
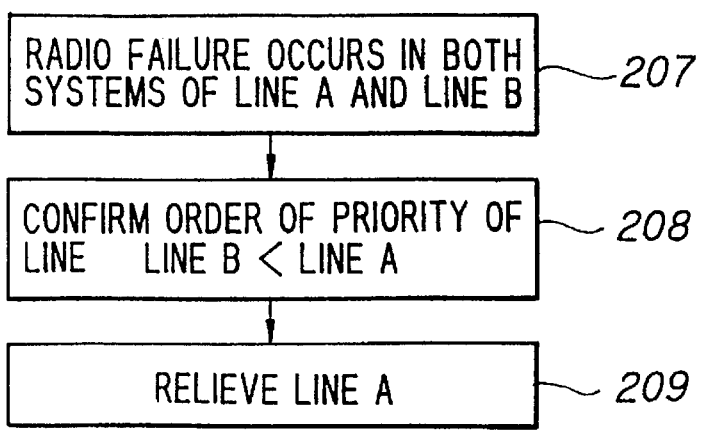
FIG. 7 is a flowchart of processing for line changeover.

FIG. 6 is a flowchart of processing for setting relief priority, and FIG. 7 is a flowchart of processing for line changeover. Initially, a 0 system, 1 system (standby system, working system) setting is made for each line and operation is started (step 201).

Next, the optical standby/working recognition unit 22' accepts the K2 byte (b1~b4) line by line and notifies the relief-rank management unit 25. The latter discriminates the standby/working state of each of the lines A~D and, based upon the results, makes the order of priority for relief of the radio working lines $14_{1W}$, $14_{3W}$ corresponding to the optical lines B, D ($13_{1W}$, $13_{2W}$) higher than the order of priority for relief of the radio working lines $14_{2W}$, $14_{4W}$ corresponding to the optical lines A, C ($13_{1P}$, $13_{2P}$) (step 202).

Next, if the optical-line changeover detector 23 detects the optical-line standby/working changeover request by referring to the K1 byte (b1~b4) on the incoming lines, the detector 23 so notifies the relief-rank management unit 25. It is assumed here that a standby/working changeover request for the optical line A (optical standby line $13_{1P}$) has been detected (step 203).

Upon receiving notification of detection of the standby/working changeover request for the optical line A from the optical-line changeover detector 23, the relief-rank management unit 25 changes the order of priority of the radio working line corresponding to optical line A. More specifically, the relief-rank management unit 25 raises the order of priority for relief of the radio working line $14_{2W}$ corresponding to the optical line A to the same level as that of the radio working line corresponding to the optical working line (step 204). Thereafter, the K2 byte (b1~b4) of the outgoing line A reverses (step 205) and the changeover request code in the K1 byte (b1~b4) on the incoming line A vanishes (step 206).

The discussion above focuses only on the optical line A. However, a standby/working changeover request for the optical line B (optical working line $13_{1W}$) in the pair with the optical line A also is issued at the same time and the relief-rank management unit 25 lowers the order of priority for relief of the radio working line $14_{1W}$ corresponding to the optical line B to the same level as that of the radio working line corresponding to the optical standby line.

When a failure has occurred in two or more radio lines A, B (radio working lines $14_{1W}$, $14_{2W}$) under these conditions, the radio-line failure detecting unit 24 detects the failure and so notifies the line changeover controller 26 (step 207).

In response to such notification, the line changeover controller 26 acquires the order of priority for relief of the lines A, B (radio working lines $14_{1W}$, $14_{2W}$) from the relief-rank management unit 25 and determines the fact that the order of priority for relief of radio line A is higher than that for relief of radio line B (step 208). As a result, the line changeover controller 26 instructs the radio terminal station 12a', via the incoming standby line, to change over between working/standby of the radio line A (radio working line $14_{2W}$) having the higher rank for relief and the radio standby line $14_P$. The radio terminal station 12a performs the changeover between working/standby of the designated radio line A and the radio standby line $14_P$ and transmits data, which is to be sent to the radio working line $14_{2W}$ that failed, via the radio standby line $14_P$ (step 209).

Thus, the second embodiment is so adapted that when a dual failure occurs in radio lines, it is possible to give a higher priority to the relief of a radio line corresponding to an optical working line than to a radio line corresponding to an optical standby line. As a result, a radio line can be relieved while taking into consideration the redundancy of the optical transmission line.

In a case where the second embodiment is applied to the SDH network shown in FIG. 23, N-number of pairs of the optical working lines and optical standby lines are provided. In addition, radio working lines are provided to correspond to respective ones of n (<N)-number of optical working lines and n-number of optical standby lines, and a single radio standby line is provided, these lines serving as the radio lines 14. Further, data from (N-n)-number of optical radio lines and (N-n)-number of optical standby lines is transmitted via optical transmission lines provided in parallel with the radio transmission lines. With regard to the n-pairs of radio lines, the second embodiment described above is applied. If this arrangement is adopted, the reliability of the network can be improved.

(D) Second Embodiment of the Invention

Figure 8:
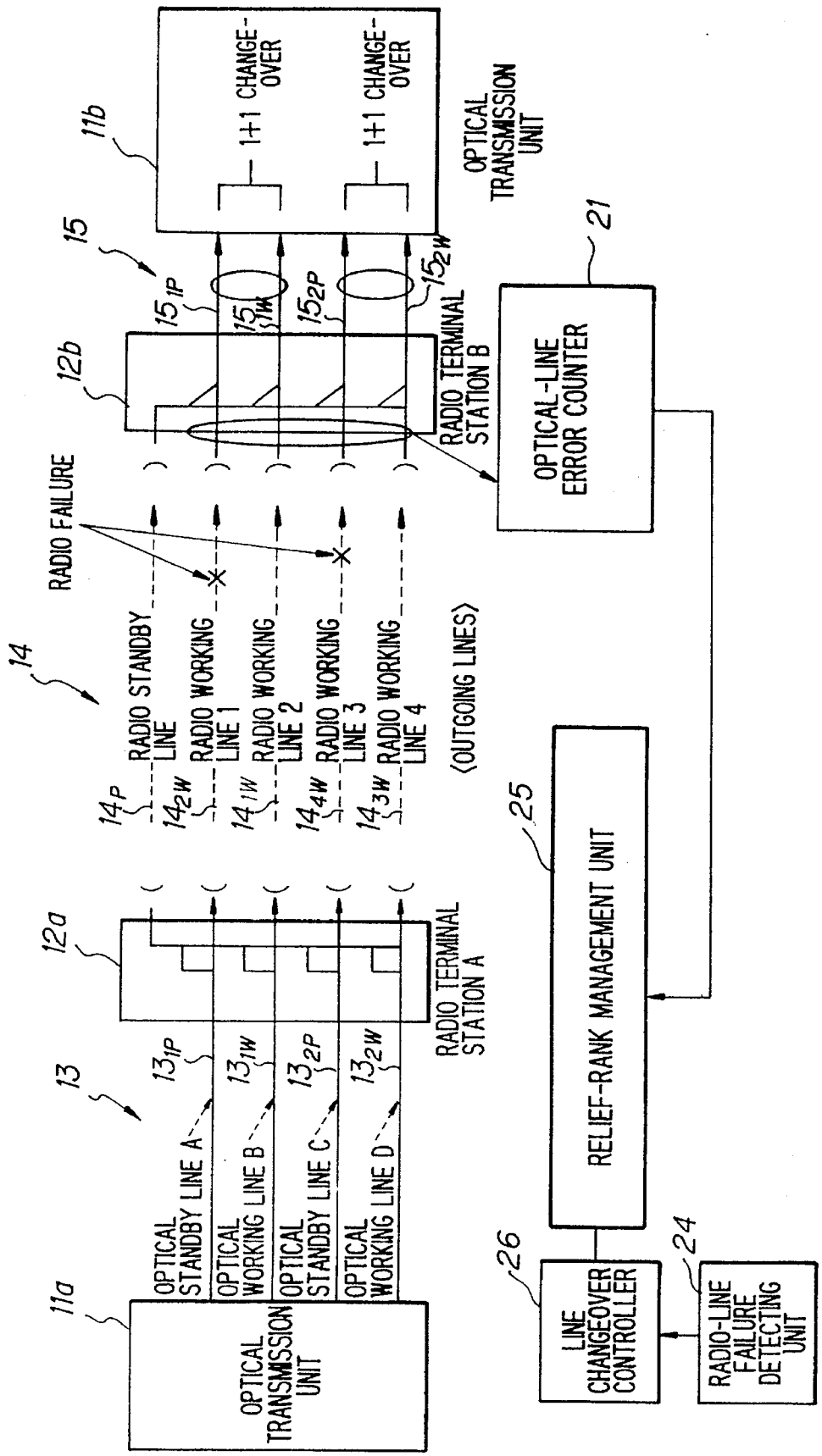
FIG. 8 is a diagram for describing a method of relieving radio lines according to a third embodiment of the present invention.

FIG. 8 is a diagram for describing a method of relieving radio lines in an SDH network according to a third embodiment of the present invention. According to the third embodiment, a radio line is relieved upon giving consideration to line condition in an optical transmission line. It should be noted that the third embodiment is applicable to the SDH networks shown in FIGS. 21~23.

Shown in FIG. 8 are the optical transmission units 11a, 11b, the radio unit (terminal station A) 12a and the radio unit (terminal station B) 12b. The optical transmission line 13 has radio working lines $13_{1W}$, $13_{2W}$ and optical standby lines $13_{1P}$, $13_{2P}$, and the optical transmission line 15 has radio working lines $15_{1W}$, $15_{2W}$ and optical standby lines $15_{1P}$, $15_{2P}$. The optical working line $13_{iW}$ (i=1, 2, ...) and the optical standby line $13_{iP}$ form a pair. When a failure has occurred in an optical working line $13_{iW}$, a changeover is made between working/standby of the optical working line $13_{iW}$ and the optical standby line $13_{iP}$. The radio transmission line 14, which is introduced between the optical transmission lines 13 and 15, has radio working lines $14_{1W}$~$14_{4W}$ corresponding to respective ones of the optical working lines $13_{1W}$, $13_{2S}$ and optical standby lines $13_{1P}$, $13_{2P}$, as well as one radio standby line $14_P$.

An optical-line error counter 21 performs a parity check using the B2 bytes on the outgoing lines corresponding to the optical working lines $13_{1W}$, $13_{2W}$ and counts the number of parity errors. The relief-rank management unit 25 accepts the error count of each line corresponding to the working lines $13_{1W}$, $13_{2W}$, ascertains the line condition based upon the magnitude of the count and makes the rank for relief of a radio working line corresponding to an optical standby line in a pair with a line having a large error count higher than the rank for relief of radio working lines corresponding to optical standby lines in pairs with optical working lines having a satisfactory line condition.

In a case where radio failure has occurred simultaneously in the radio working lines $14_{2W}$, $14_{4W}$ corresponding to the optical standby lines $13_{1P}$, $13_{2P}$, the order of priority for relief must be decided in the following manner: Specifically, the order of priority for relieving the radio working lines $14_{2W}$, $14_{4W}$ must be decided based upon the degree to which changeover of the optical working lines $13_{1W}$, $13_{2W}$ in pairs with the optical standby lines $13_{1P}$, $13_{2P}$ from the working state to the standby state due to a decline in quality is possible. For example, assume that priority for relief has been given to the radio working line $14_{2W}$ corresponding to the optical standby line $13_{1P}$ rather than to the radio working line $14_{2W}$ corresponding to the optical standby line $13_{2P}$. In such case, assume that the optical working line $13_{2W}$ subsequently changes over to standby owing to a decline in quality and that the optical standby line $13_{2P}$ changes over to working. If this occurs, the radio working line $14_{4W}$ corresponding to the optical line $13_{2P}$ fails in the radio section and, hence, data communication can no longer be performed between the optical transmission units $11a$, $11b$. Accordingly, the radio unit $12b$ monitors the B2 byte and ascertains the line quality of the optical working lines, whereby the radio working line corresponding to the optical standby line in the pair with the optical working line having an unsatisfactory line quality is relieved at a priority higher than that of the radio working lines corresponding to the other optical standby lines.

(E) Modifications

The first embodiment decides the order of priority for relief upon taking into account the occurrence of failure outside the radio section, the second embodiment decides the order of priority for relief upon taking into account whether an optical line is working or standby, and the third embodiment decides the order of priority for relief upon taking into account the line quality of an optical working line. The first through third embodiments can be combined in suitable fashion to decide the order of priority for relief.

(a) Combination of First and Second Embodiments (1) The relief-rank management unit 25 makes the rank for relief of radio working lines corresponding to optical working lines higher than the rank for relief of radio working lines corresponding to optical standby lines. (2) When occurrence of failure has been detected in an optical working line, the relief-rank management unit 25 makes the rank for relief of the radio working line corresponding to this optical working line lower than rank for relief of radio working lines corresponding to optical working lines that have not failed. (3) When occurrence of failure has been detected in an optical standby line, the relief-rank management unit 25 makes the rank for relief of the radio working line corresponding to this optical standby line lower than rank for relief of radio working lines corresponding to optical standby lines that have not failed. When a failure has occurred in two or more radio working lines, the line changeover controller 26 changes over between working/standby of a radio working line having a higher rank for relief and the radio standby line $14_P$, and transmits data, which is to be sent to a radio working line that failed, via the radio standby line $14_P$.

(b) Combination of Second and Third Embodiments

The relief-rank management unit 25 (1) makes the rank for relief of radio working lines corresponding to optical working lines higher than the rank for relief of radio working lines corresponding to optical standby lines, and (2) makes the rank for relief of a radio working line corresponding to an optical standby line in a pair with an optical working line having an unsatisfactory line condition higher than the rank for relief of radio working lines corresponding to optical standby lines in pairs with optical working lines having a satisfactory line condition. When a failure has occurred in two or more radio working lines, the line changeover controller 26 changes over between working/standby of a radio working line having a higher rank for relief and the radio standby line, and transmits data, which is to be sent to a radio working line that failed, via the radio standby line.

(c) Combination of First, Second and Third Embodiments (1) The relief-rank management unit 25 makes the rank for relief of radio working lines corresponding to optical working lines higher than the rank for relief of radio working lines corresponding to optical standby lines. (2) When occurrence of failure has been detected in an optical working line, the relief-rank management unit 25 makes the rank for relief of the radio working line corresponding to this optical working line lower than rank for relief of radio working lines corresponding to optical working lines that have not failed. (3) When occurrence of failure has been detected in an optical standby line, the relief-rank management unit 25 makes the rank for relief of the radio working line corresponding to this optical standby line lower than rank for relief of radio working lines corresponding to optical standby lines that have not failed. (4) The relief-rank management unit 25 makes the rank for relief of a radio working line corresponding to an optical standby line in a pair with an optical working line having an unsatisfactory line condition higher than the rank for relief of radio working lines corresponding to optical standby lines in pairs with optical working lines having a satisfactory line condition. When a failure has occurred in two or more radio working lines, the line changeover controller 26 changes over between working/standby of a radio working line having a higher rank for relief and the radio standby line, and transmits data, which is to be sent to a radio working line that failed, via the radio standby line.

(F) Construction of Radio Unit (a) Overall Construction

Figure 9:
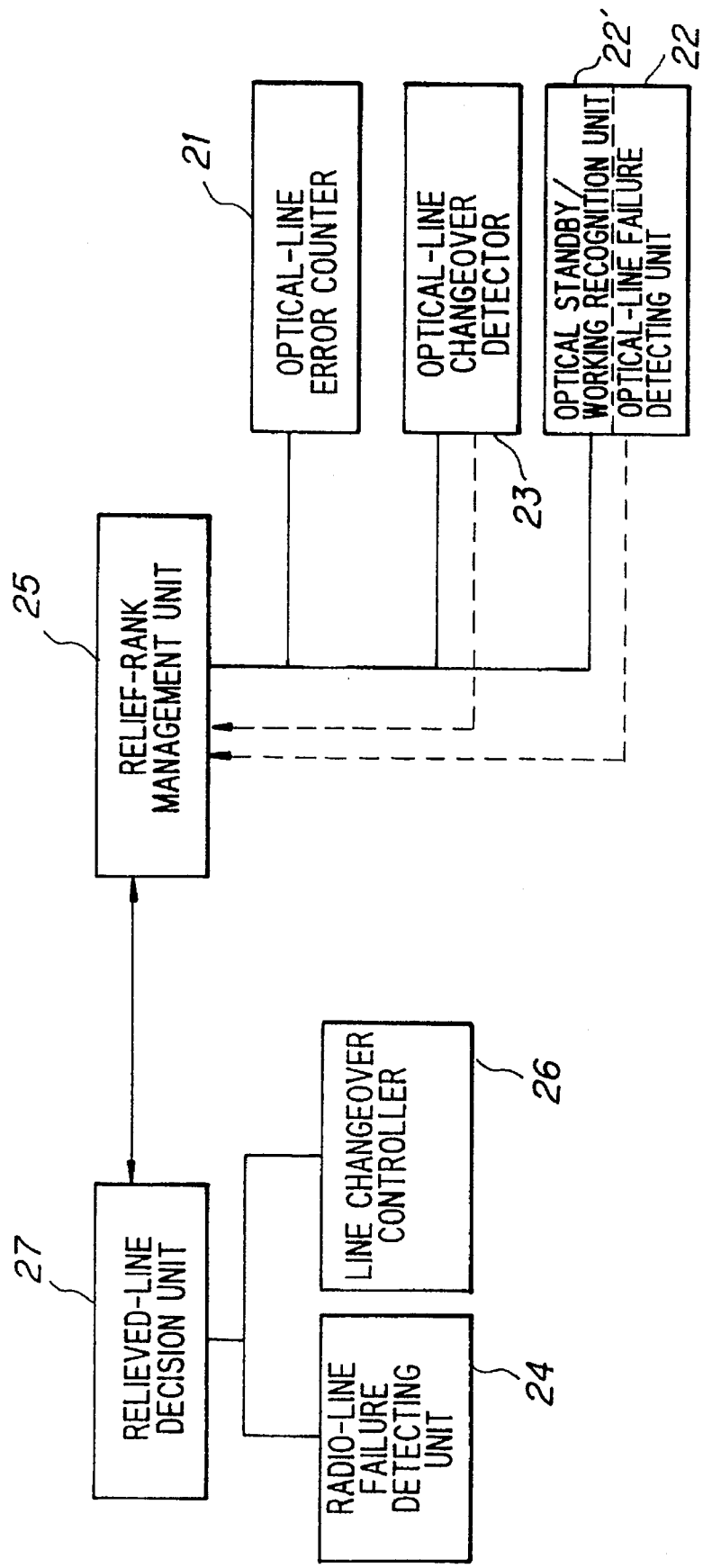
FIG. 9 is a diagram showing the construction of a radio unit on a receiving end.

FIG. 9 is a block diagram showing radio unit on the receiving end in a case where the first, second and third embodiments are combined. The radio unit includes the optical-line error counter 21 for counting errors on each optical line, the optical-line failure detecting unit 22 having the detectors 22a, 22b (see FIG. 2) for detecting failure outside the radio section, the optical standby/working recognition unit 22' for determining whether a line is operating as a working line or as a standby line, the optical-line changeover detector 23 for detecting a working/standby changeover request, the radio-line failure detecting unit 24 for detecting failure in the radio lines, the relief-rank management unit 25 for managing the rank of relief for the radio lines, the line changeover controller 26 for controlling changeover of the optical lines, and a relieved-line decision unit 27 for discriminating a radio working line having a high order of priority for relief.

(b) Interfaces

FIGS. 10A–10D are views for describing interfaces between various units. FIG. 10A shows the interface between the optical-line error counter 21 and relief-rank management unit 25, FIG. 10B the interface between the optical-line changeover detector 23 and relief-rank management unit 25, FIG. 10C the interface between the optical-line failure detecting unit 22, optical standby/working recognition unit 22' and the relief-rank management unit 25, and FIG. 10D the interface between the relieved-line decision unit 27 and relief-rank management unit 25.

The relief-rank management unit 25 reads the count of errors on each line out of the optical-line error counter unit 21 as eight-bit data at prescribed times and ascertains the line quality.

When a changeover request has been detected by the optical-line changeover detector 23, the relief-rank management unit 25 reads, as eight-bit data from the optical-line changeover detector 23, an optical standby/working pair code and the K1 byte (b1–b4) on the incoming lines and recognizes a working→standby, standby→working changeover of two lines constructing the pair designated by the pair code. In order to detect reversal of the K2 byte (b1~b4) on the outgoing lines and disappearance of the changeover request of the K1 byte (b1~b4) on the incoming lines, the relief-rank management unit 25 reads these items of data from the optical standby/working recognition unit 22' and optical-line changeover detector 23. It should be noted that the optical standby/working pair codes are of 16 types 0000~1111. Correspondence between pair codes and the two lines constructing each pair is established in advance.

Furthermore, when failure outside of the radio section has been detected by the optical-line failure detecting unit 22, the relief-rank management unit reads the K2 byte (b6~b8) on the incoming lines and the K2 byte (b6~b8) on the outgoing lines from the optical-line failure detecting unit 22.

In response to start of operation after initial settings have been made, the relief-rank management unit 25 reads information indicative of the 0 system or 1 system held as initially set information as well as the K2 byte (b1~b4) and recognizes whether each line is working or standby.

(c) Construction of Optical-Line Error Counter

Figure 11:
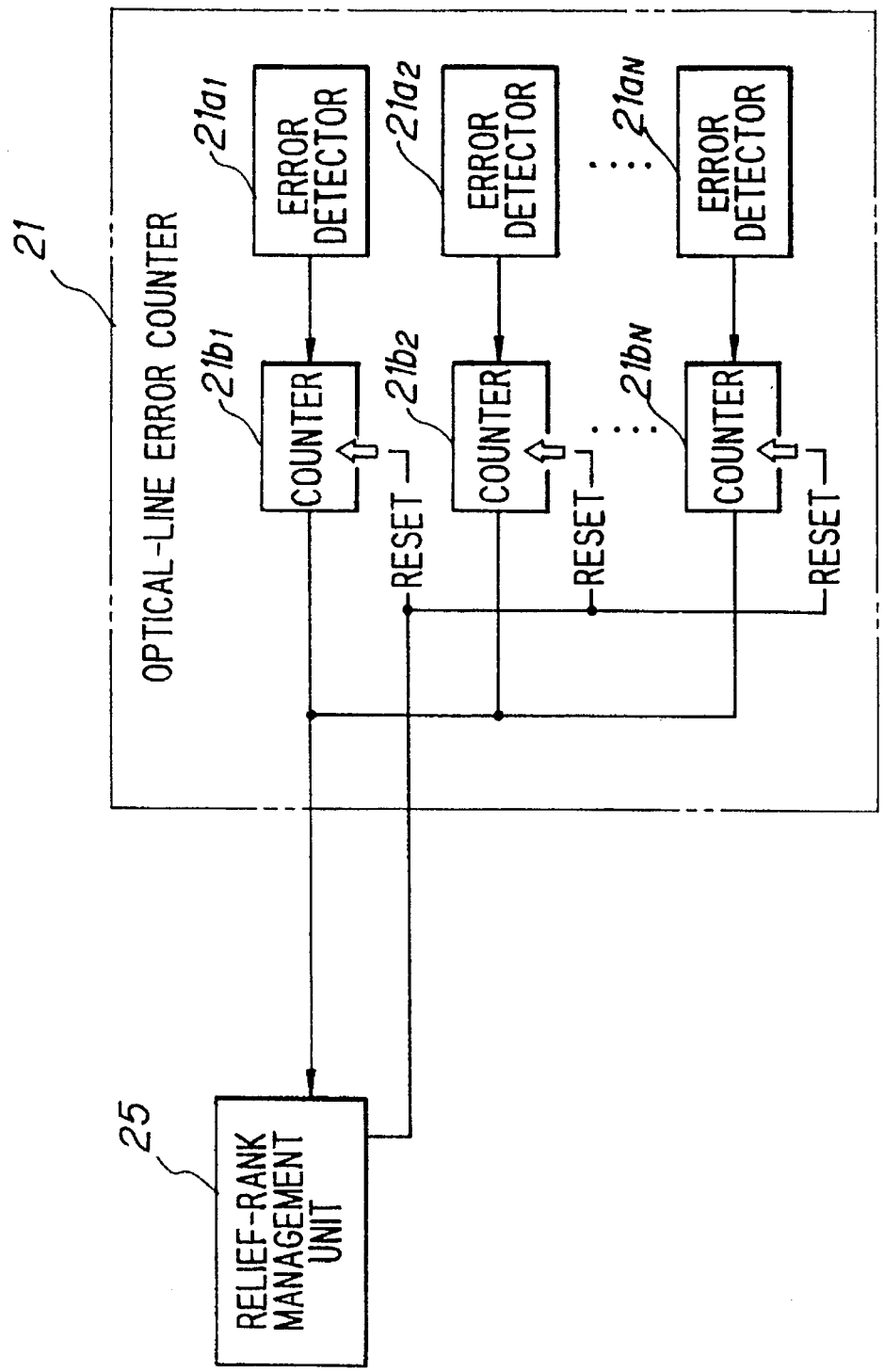
FIG. 11 is a block diagram showing an optical-line error counting unit.

FIG. 11 is a block diagram showing the construction of the optical-line error counter 21. The counter 21 includes error detectors $21a_1$~$21a_N$ for monitoring the B2 byte of respective ones of the lines, performing a parity check using the B2 byte and detecting the number of errors on the respective lines, and counters $21b_1$~$21b_N$ for counting the number of errors per prescribed period of time on respective ones of the lines. The relief-rank management unit 25 reads the counts (the error counts) of the counters $21b_1$~$21b_N$ and clears the contents thereof at a prescribed period.

(d) Construction of Optical-Line Changeover Detector

Figure 12:
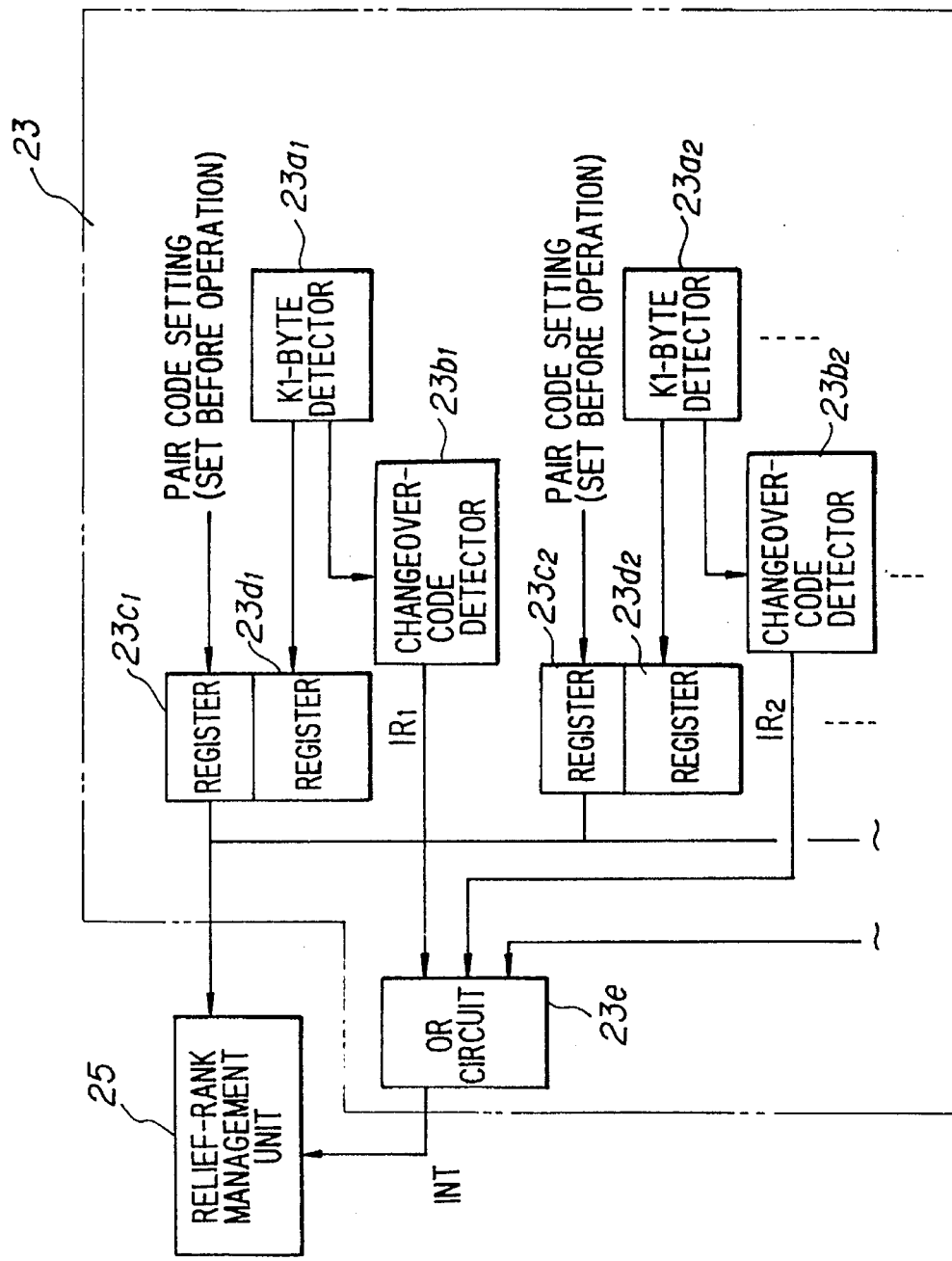
FIG. 12 is a block diagram showing an optical-line changeover detecting unit.

FIG. 12 is a block diagram showing the construction of the optical-line changeover detector 23. The portion of the detector 23 shown here is for handling two of the N-number of lines. The optical-line changeover detector 23 includes K1-byte detectors $23a_1$~$23a_N$ for detecting the K1 byte (b1~b4) on respective ones of the incoming lines and outputting the same, changeover-code detectors $23b_1$~$23b_N$ for outputting high-level signals $IR_1$~$IR_N$ upon detecting a standby/working changeover code from the K1 byte (b1~b4), registers $23c_1$~$23c_N$ for storing the correspondence between a pair code, which has been initially set, and the two lines constructing the pair, registers $23d_1$~$23d_N$ for storing the detected K1 byte (b1~b4), and an OR gate 23e for outputting an interrupt signal INT when a changeover code has been detected on any line. When the interrupt signal INT has been generated, the relief-rank management unit 25 recognizes the pair of lines to undergo the standby/working changeover by reading (1) the pair codes that have been set in the registers $23c_1$~$23c_N$ and (2) the K1 byte (b1~b4) that has been set in the registers $23d_1$~$23d_N$.

(e) Construction of Optical Standby/Working Recognition Unit

Figure 13:
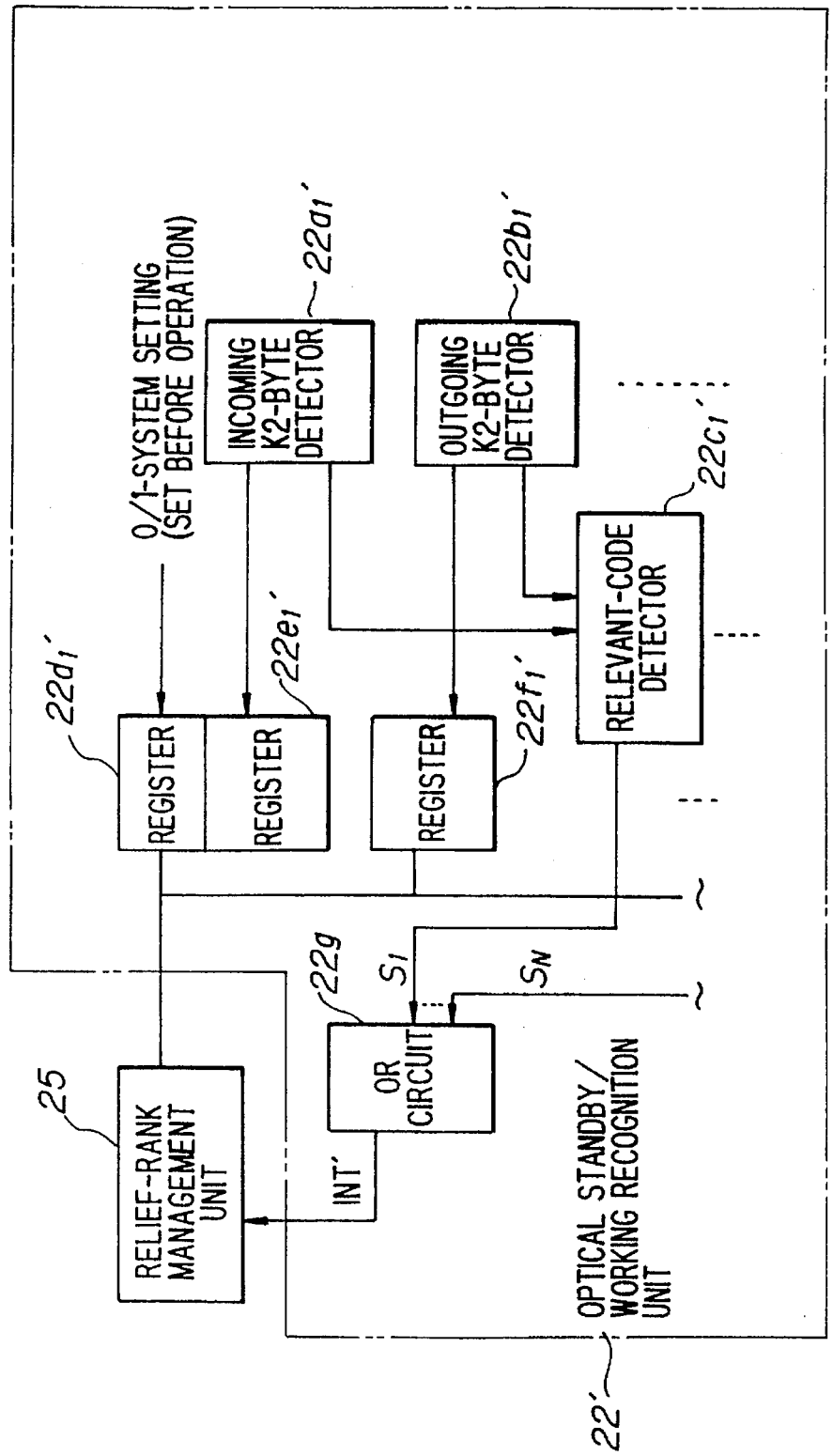
FIG. 13 is a block diagram showing an optical standby/working recognition unit.

FIG. 13 is a block diagram showing the construction of the optical standby/working recognition unit 22'. The portion of the unit 22' shown here is for handling one of the N-number of lines. In the description rendered thus far, the optical-line failure detecting unit 22 and the optical standby/working recognition unit 22' have been discussed separately. In the actual arrangement, however, the function for detecting optical line failure is incorporated in the optical standby/working recognition unit 22'.

The optical standby/working recognition unit 22' includes incoming K2-byte detectors $22a_1'$~$22a_N'$ for detecting the K2 byte (b6~b8) on respective ones of the incoming lines and outputting the same, outgoing K2-byte detectors $22b_1'$~$22b_N'$ for detecting the K2 byte (b6~b8) on respective ones of the outgoing lines and outputting the same, relevant-code detectors $22c_1'$~$22c_N'$ for outputting high-level signals $S_1$~$S_N$, respectively, upon detecting (1) relevant information (FERF/MS-AIS) of the K2 byte (b1~b4) and relevant information (working/standby reversal) of the K2 byte (b1~b4), registers $22d_1'$~$22d_N'$ for storing working/standby setting information set before operation, registers $22e_1'$~$22e_N'$ for storing the incoming K2 byte (b6~b8) that has been detected, registers $22f_1'$~$22f_N'$ for storing the outgoing K2 byte (b1~b8) that has been detected, and an OR gate 22g for taking the OR of the signals $S_1$~$S_N$ and outputting an interrupt signal INT'

When the interrupt signal INT' has been generated, the relief-rank management unit 25 reads the working/standby setting information that has been set in the registers $22d_1'$~$22d_N'$, the incoming K2 byte (b6~b8) information that has been set in the registers $22e_1'$~$22e_N'$ and the outgoing K2 byte (b1~b8) information that has been set in the registers $22f_1'$~$22f_N'$, and identifies occurrence of failure outside the radio section as well as standby/working lines.

(f) Construction of Relief-Rank Management Unit

Figure 14:
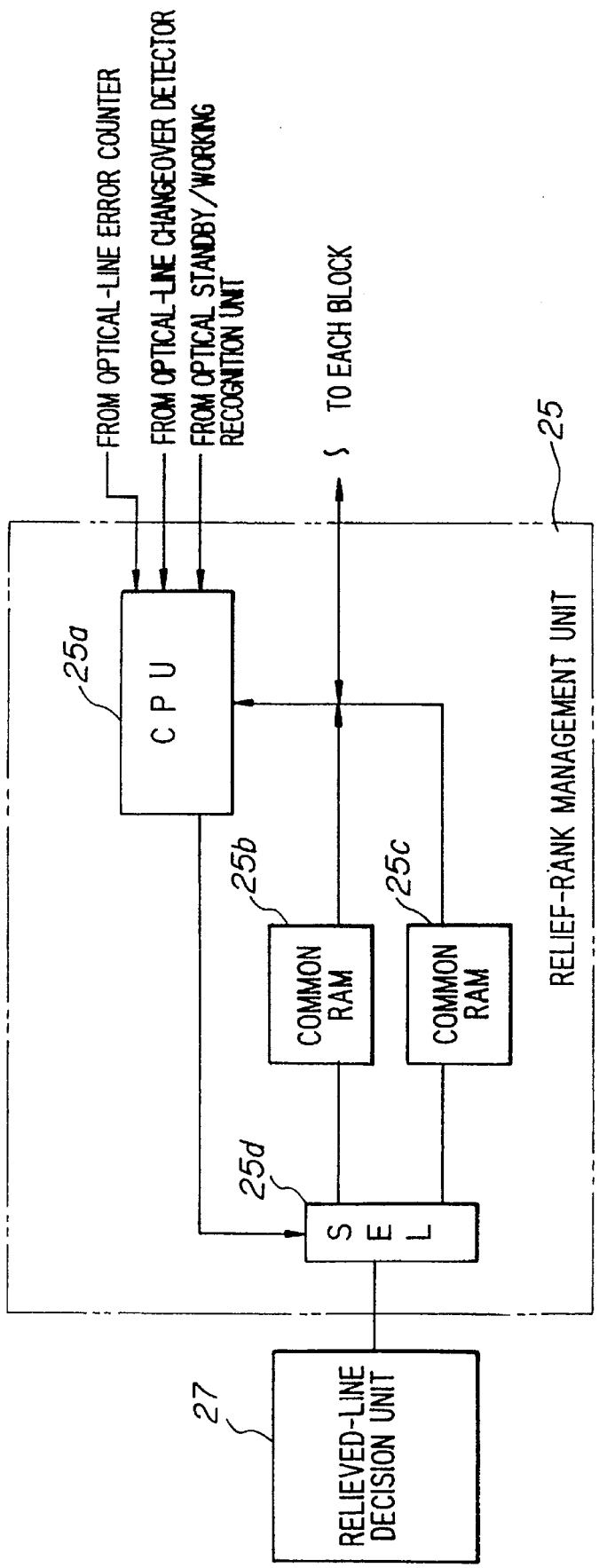
FIG. 14 is a block diagram showing the construction of a relief rank management unit.

FIG. 14 is a block diagram showing the construction of the relief rank management unit 25. The relief-rank management unit 25 includes a processor (CPU) 25a for sending/receiving information in accordance with the above-mentioned interfaces and executing processing for setting the rank of relief for radio lines, a setting/rewrite common RAM (a standby common RAM) 25b for storing a relief order-of-priority table, a notification common RAM (active common RAM) 25c for storing a relief order-of-priority table, and a selector 25d controlled by the CPU 25a.

The relief order-of-priority table holds relief ranks in correspondence with respective ones of the line numbers. The table is read by the relieved-line decision unit 27 using the interface of FIG. 10D via the notification common RAM 25c. When (1) line failures in a plurality of lines are detected simultaneously or (2) a failure occurs in one line when another line has been changed over for relief, the relieved-line decision unit 27 refers to the latest relief order-of-priority table, decides upon a radio line to be relieved preferentially and instructs the line changeover controller 26 to relieve this line.

The two common RAMs, namely the RAM for setting/rewrite (standby system) and the RAM for notification (active system), are provided for the purpose of protection in a case where reading in of the table by the relieved-line decision unit 27 and the writing of the table by the CPU 25a are carried out simultaneously. In a case where setting/rewriting of order of priority is carried out, the CPU 25a writes the altered table in each of the common RAMs 25b, 25c and controls the selector 25d at the same time as the end of the rewriting operation so that the relieved-line decision unit 27 is capable of accessing the notification common RAM 25c. This arrangement assures that a situation will not arise in which reading in of the table by the relieved-line decision unit 27 and the writing of the table in the common RAMs by the CPU 25a take place simultaneously.

(g) Processing for Management of Order of Priority

Figure 15:
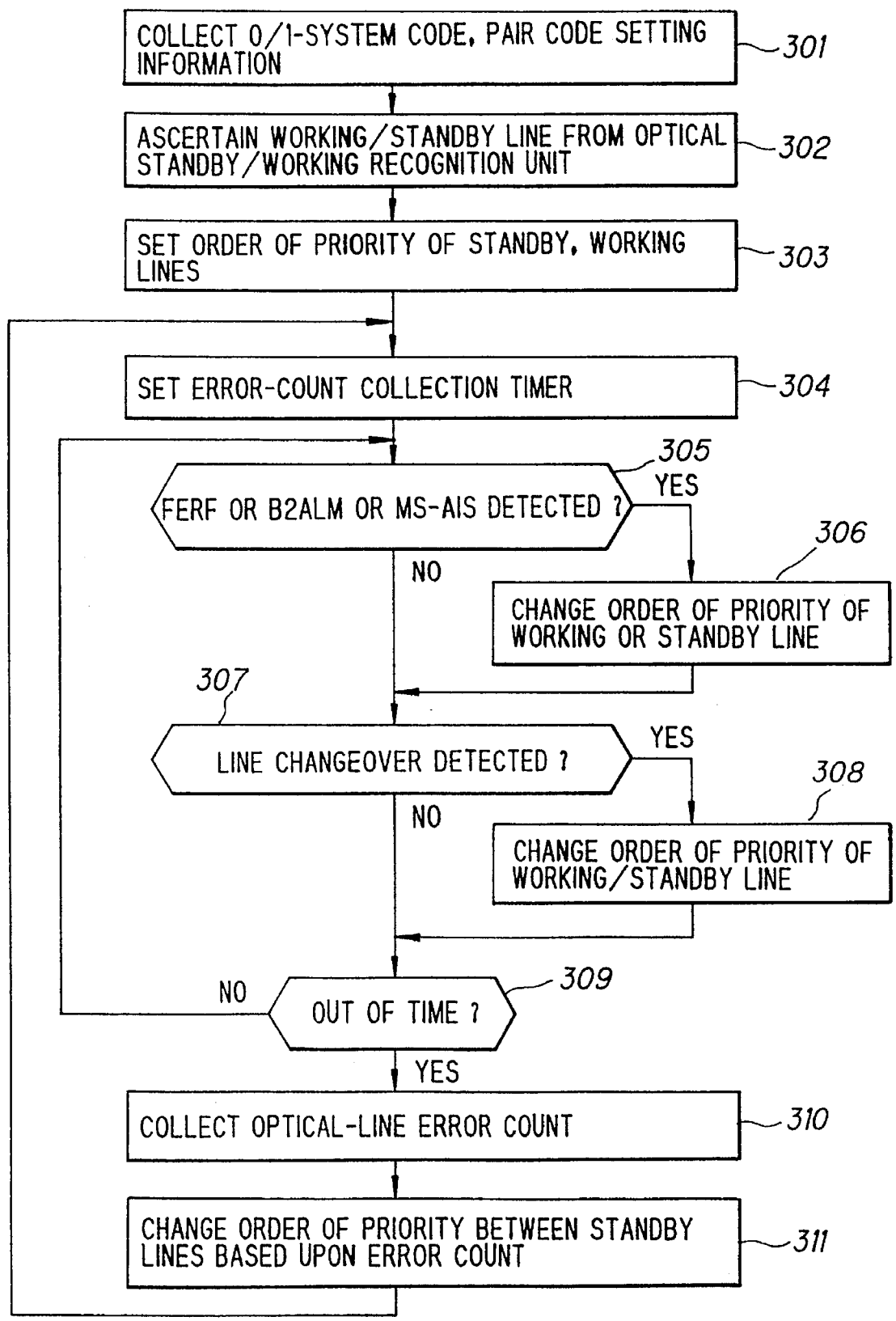
FIG. 15 is a flowchart of processing for relief rank management.
Figure 16A:
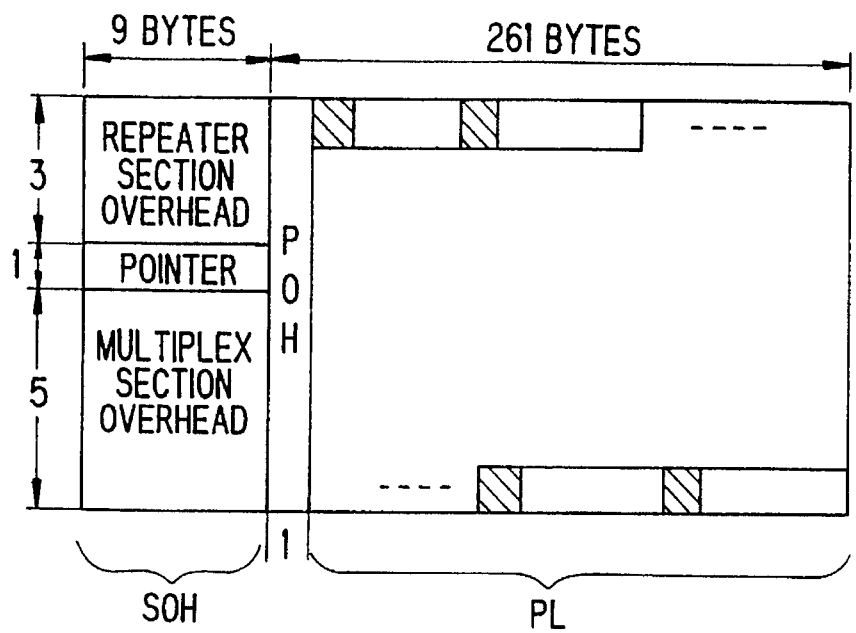
FIGS. 16A, 16B are diagrams for describing the structure of a frame in SDH.
Figure 16B:
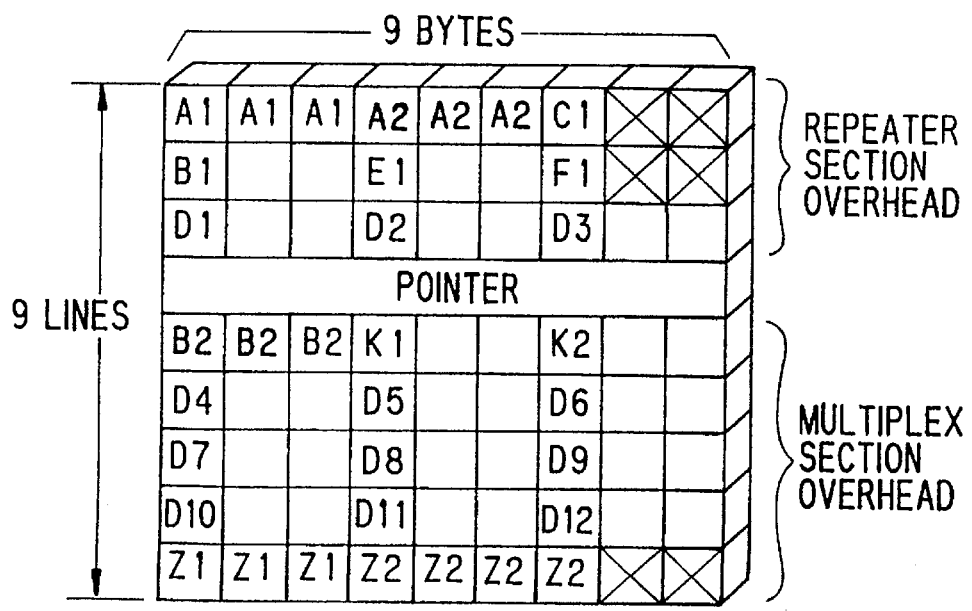
Figure 17:
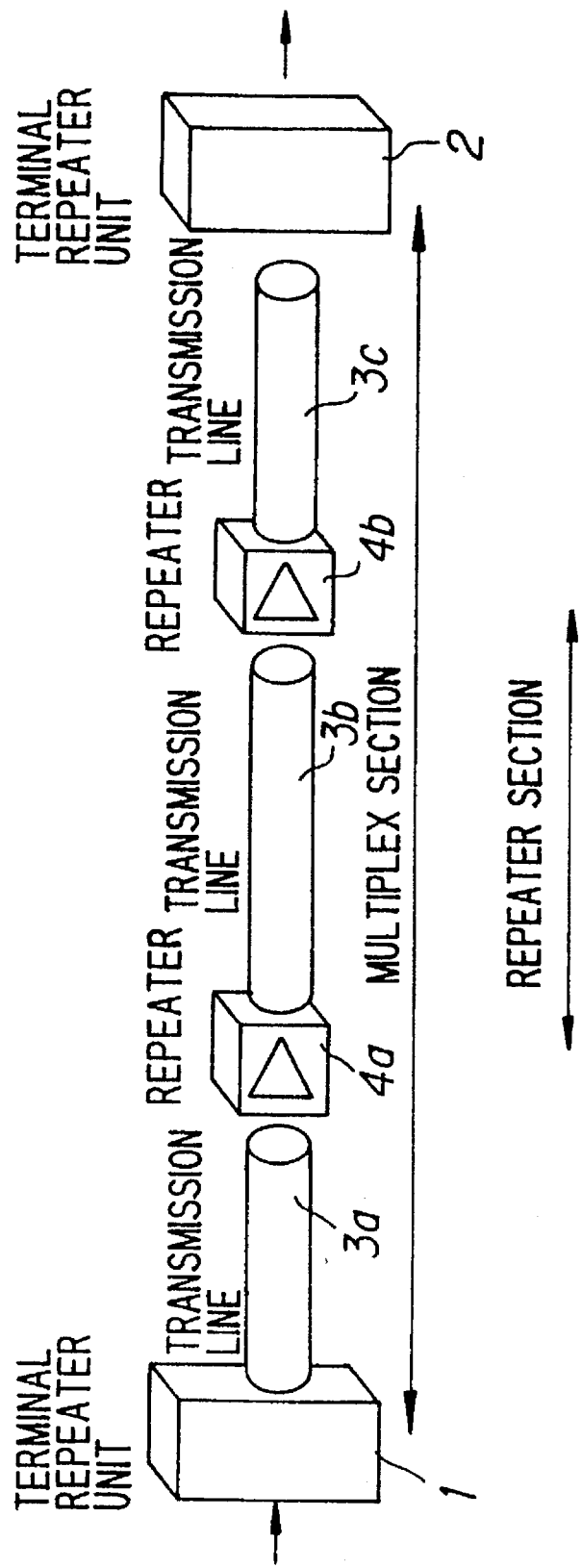
FIG. 17 is a diagram for describing a multiplex section and a repeater section.

FIG. 15 is a flowchart of processing for relief rank management performed by the relief-rank management unit 25.

The 0/1-system (standby/working) code and the pair code are set for each line before the start of operation. When operation is started under these settings, the relief-rank management unit 25 collects the 0/1-system (standby/working) codes and the pair codes that have been set (step 301).

Next, the relief-rank management unit reads the K2 byte (b1~b4) of each line from the optical standby/working recognition unit 22', compares the K2 byte (b1~b4) and the initially 0/1-system code (0001/0010) and makes the working/standby determination (step 302).

If it is possible to ascertain whether each line is working or standby, then the relief-rank management unit 25 makes the rank for relief of a working line higher than that for relieve of a standby line (step 303). It should be noted that initially the ranks for relief of the working lines are made the same level and the ranks for relief of the standby lines are made the same level, and that the rank for relief is then altered in dependence upon the occurrence of failure outside the radio section and the quality of the line (the condition of the line).

Next, an error-count collection timer is started (step 304). Thereafter, a check is performed to determine whether FERF/B2ALM/MS-AIS has been detected by the optical standby/working recognition unit 22', namely whether a failure has occurred outside the radio section (step 305). If a failure has occurred outside the radio section, the K2 byte (b6~b8) on the outgoing lines and the K2 byte (b6~b8) on the incoming lines are read by the optical standby/working recognition unit 22'. If the faulty line is a working line, the relief rank is made the lowest among the working lines. If the faulty line is a standby line, the relief rank is made the lowest among the standby lines (step 306).

Next, it is determined whether a standby/working changeover request has been detected by the optical-line changeover detector 23 (step 307). If this changeover request has been detected, the pair code and the K1 byte (b1~b4) of the incoming lines are read from the optical-line changeover detector 23. In a case where line changeover is working→standby, the relief rank of the line is changed to the standby rank. If the line changeover is standby→working, the relief rank of the line is changed to the working rank (step 308).

Next, it is determined whether the error-count collection timer has run out of time (step 309). If time has not run out, then processing from step 305 onward is repeated. If time runs out, however, the error count of each line is acquired from the optical-line error counter 21 (step 310), the line condition of each optical working line is ascertained based upon the magnitude of the error count and the rank for relief of a radio working line corresponding to an optical standby line in a pair with an optical working line having an unsatisfactory line condition is made higher than the rank for relief of radio working lines corresponding to optical standby lines in pairs with optical working lines having a satisfactory line condition (step 311). The program then returns to step 304 and repeating from this step onward is repeated.

In accordance with the present invention, the rank for relief of a radio line corresponding to a faulty optical line is reduced. As a result, it is possible to give priority to relief of a radio line corresponding to an optical line that is not faulty. In other words, it is possible to relieve a radio line upon taking into consideration the state of failure occurrence in an optical transmission line.

In accordance with the present invention, it is possible to give a higher priority to the relief of a radio line corresponding to an optical working line than to a radio line corresponding to an optical standby line. As a result, it is possible to relieve a radio line upon taking into consideration the redundancy of an optical transmission line.

In accordance with the present invention, it is possible to give a higher priority to the relief of a radio line corresponding to an optical standby line in a pair with an optical working line having an unsatisfactory line condition than to a radio line corresponding to an optical standby line in a pair with an optical working line having a satisfactory line condition. As a result, it is possible to relieve a radio line upon taking into consideration the line condition in a transmission line.

In accordance with the present invention, it is possible to give a higher priority to the relief of a radio line corresponding to an optical working line than to a radio line corresponding to an optical standby line and, moreover, to lower the rank for relief of a radio line corresponding to a faulty optical line. As a result, it is possible to relieve a radio line upon taking into consideration both the redundant configuration of the optical transmission line and the state of failure occurrence in the optical transmission line.

In accordance with the present invention, it is possible to give a higher priority to the relief of a radio line corresponding to an optical working line than to a radio line corresponding to an optical standby line and, moreover, to give a higher priority to the relief of a radio line corresponding to an optical standby line in a pair with an optical working line having an unsatisfactory line condition than to a radio line corresponding to an optical standby line in a pair with an optical working line having a satisfactory line condition. As a result, it is possible to relieve a radio line upon taking into consideration both the redundant configuration of the optical transmission line and the state of failure occurrence in the optical transmission line.

In accordance with the present invention, (1) a higher priority is given to the relief of a radio line corresponding to an optical working line than to a radio line corresponding to an optical standby line; (2) the rank for relief of a radio line corresponding to a faulty optical line is reduced; and (3) a higher priority is given to the relief of a radio line corresponding to an optical standby line in a pair with an optical working line having an unsatisfactory line condition than to a radio line corresponding to an optical standby line in a pair with an optical working line having a satisfactory line condition. As a result, it is possible to relieve a radio line upon taking into consideration the redundancy of the optical transmission line, the line condition in the transmission line and the state of failure occurrence in an optical transmission line.

As many apparently widely different embodiments of the present invention can be made without departing from the spirit and scope thereof, it is to be understood that the invention is not limited to the specific embodiments thereof except as defined in the appended claims.

What is claimed is:

1. A method of relieving a radio line in a synchronous digital hierarchy (SDH) network in which a radio transmission line is introduced between optical transmission lines each of which has a plurality of optical lines, comprising the steps of:

providing radio working lines corresponding to respective ones of optical lines and providing one radio standby line;

monitoring occurrence of failure in each optical line and occurrence of failure in the radio working lines;

when occurrence of failure in an optical line has been detected, making rank for relief of the radio working line corresponding to this optical line lower than rank for relief of radio working lines corresponding to optical lines that have not failed; and when failure has occurred in two or more radio working lines, transmitting data, which is to be sent to a radio working line having a higher rank for relief, via the radio standby line and relieving the radio working lines in which the failure has occurred.

2. The method according to claim 1, wherein the optical lines consist of plural pairs of an optical working line and optical standby line, the radio lines have radio working lines corresponding to respective ones of the optical working lines, as well as one radio standby line.

3. The method according to claim 1, wherein the optical lines consist of plural pairs of an optical working line and optical standby line, the radio lines have radio working lines corresponding to respective ones of the optical working lines and respective ones of the optical standby lines, as well as one radio standby line.

4. The method according to claim 1, wherein the optical lines consist of N-number of pairs of an optical working line and optical standby line, the radio lines have radio working lines corresponding to respective ones of n (<N)-number of optical working lines and n-number of optical standby lines, as well as one radio standby line, and data on (N-n)-number of optical working lines and (N-n)-number of optical standby lines is optically transmitted in parallel with the radio transmission lines.

5. A method of relieving a radio line in a synchronous digital hierarchy (SDH) network in which a radio transmission line is introduced between optical transmission lines each of which has N-number of pairs of an optical working line and optical standby line, comprising the steps of:

providing radio working lines corresponding to respective ones of n (≦N)-number of optical working lines and n-number of optical standby lines, as well as one radio standby line;

making rank for relief of radio working lines corresponding to optical working lines higher than rank for relief of radio working lines corresponding to optical standby lines;

monitoring occurrence of failure in each radio working line; and when a failure has occurred in two or more radio working lines, transmitting data, which is to be sent to a radio working line having a higher rank for relief, via the radio standby line and relieving the radio working lines in which the failure has occurred.

6. The method according to claim 5, wherein when n<N holds, data on (N-n)-number of optical working lines and (N-n)-number of optical standby lines is optically transmitted in parallel with the radio transmission lines.

7. A method of relieving a radio line in a synchronous digital hierarchy (SDH) network in which a radio transmission line is introduced between optical transmission lines each of which has plural pairs of an optical working line and optical standby line, comprising the steps of:

providing radio working lines corresponding to respective ones of optical working lines and optical standby lines, as well as one radio standby line;

monitoring line condition in each optical working line and monitoring occurrence of failure in the radio working lines;

making rank for relief of a radio working line corresponding to an optical standby line in a pair with an optical working line having an unsatisfactory line condition higher than rank for relief of radio working lines corresponding to optical standby lines in pairs with optical working lines having a satisfactory line condition;

when a failure has occurred in two or more radio working lines, transmitting data, which is to be sent to a radio working line having a higher rank for relief, via the radio standby line and relieving the radio working lines in which the failure has occurred.

8. A method of relieving a radio line in a synchronous digital hierarchy (SDH) network in which a radio transmission line is introduced between optical transmission lines each of which has N-number of pairs of an optical working line and optical standby line, comprising the steps of:

providing radio working lines corresponding to respective ones of n (≦N)-number of optical working lines and n-number of optical standby lines, as well as one radio standby line;

monitoring occurrence of failure in each optical line and occurrence of failure in the radio working lines;

making rank for relief of radio working lines corresponding to optical working lines higher than rank for relief of radio working lines corresponding to optical standby lines;

when occurrence of failure in an optical working line has been detected, making rank for relief of the radio working line corresponding to this optical working line lower than rank for relief of radio working lines corresponding to optical lines that have not failed and, when occurrence of failure in an optical standby line has been detected, making rank for relief of the radio working line corresponding to this optical standby line lower than rank for relief of radio working lines corresponding to optical standby lines that have not failed; and when a failure has occurred in two or more radio working lines, transmitting data, which is to be sent to a radio working line having a higher rank for relief, via the radio standby line and relieving the radio working lines in which the failure has occurred.

9. A method of relieving a radio line in a synchronous digital hierarchy (SDH) network in which a radio transmission line is introduced between optical transmission lines each of which has plural pairs of an optical working line and optical standby line, comprising the steps of:

providing radio working lines corresponding to respective ones of optical working lines and optical standby lines, as well as one radio standby line;

monitoring line condition in each optical working line and monitoring occurrence of failure in the radio working lines;

making rank for relief of radio working lines corresponding to optical working lines higher than rank for relief of radio working lines corresponding to optical standby lines, and making rank for relief of a radio working line corresponding to an optical standby line in a pair with an optical working line having an unsatisfactory line condition higher than rank for relief of radio working lines corresponding to optical standby lines in pairs with optical working lines having a satisfactory line condition;

when a failure has occurred in two or more radio working lines, transmitting data, which is to be sent to a radio working line having a higher rank for relief, via the radio standby line and relieving the radio working lines in which the failure has occurred.

10. A method of relieving a radio line in a synchronous digital hierarchy (SDH) network in which a radio transmission line is introduced between optical transmission lines each of which has plural pairs of an optical working line and optical standby line, comprising the steps of:

providing radio working lines corresponding to respective ones of optical working lines and optical standby lines, as well as one radio standby line;

monitoring line condition and occurrence of failure in each optical line and monitoring occurrence of failure in the radio working lines;

deciding rank for relief of the radio lines in accordance with (1), (2), (3) below:
  (1) making rank for relief of radio working lines corresponding to optical working lines higher than rank for relief of radio working lines corresponding to optical standby lines;
  (2) when occurrence of failure in an optical working line has been detected, making rank for relief of the radio working line corresponding to this optical working line lower than rank for relief of radio working lines corresponding to optical lines that have not failed and, when occurrence of failure in an optical standby line has been detected, making rank for relief of the radio working line corresponding to this optical standby line lower than rank for relief of radio working lines corresponding to optical standby lines that have not failed;
  (3) making rank for relief of a radio working line corresponding to an optical standby line in a pair with an optical working line having an unsatisfactory line condition higher than rank for relief of radio working lines corresponding to optical standby lines in pairs with optical working lines having a satisfactory line condition; and when a failure has occurred in two or more radio working lines, transmitting data, which is to be sent to a radio working line having a higher rank for relief, via the radio standby line and relieving the radio working lines in which the failure has occurred.

11. A radio equipment in an SDH network in which a radio transmission line is introduced between optical transmission lines each of which has a plurality of optical lines, said radio transmission line having radio working lines corresponding to respective ones of prescribed optical lines, as well as one radio standby line, said radio equipment comprising:

first detecting means for detecting occurrence of failure in each optical line;

second detecting means for detecting occurrence of failure in each radio working line;

relief-rank management means which, when occurrence of failure in an optical line has been detected, is for making rank for relief of the radio working line corresponding to this optical line lower than rank for relief of radio working lines corresponding to optical lines that have not failed; and line changeover control means which, when failure has occurred in two or more radio working lines, is for transmitting data, which is to be sent to a radio working line having a higher rank for relief, via the radio standby line.

12. A radio equipment in an SDH network in which a radio transmission line is introduced between optical transmission lines each of which has N-number of pairs of an optical working line and optical standby line, said radio transmission line having radio working lines corresponding to respective ones of n ($\leq$N)-number of optical working lines and n-number of optical standby lines, as well as one radio standby line, said radio equipment comprising:

relief-rank management mans for making rank for relief of radio working lines corresponding to optical working lines higher than rank for relief of radio working lines corresponding to optical standby lines;

detecting means for detecting occurrence of failure in each radio working line; and line changeover control means which, when failure has occurred in two or more radio working lines, is for transmitting data, which is to be sent to a radio working line having a higher rank for relief, via the radio standby line.

13. A radio equipment in an SDH network in which a radio transmission line is introduced between optical transmission lines each of which has plural pairs of an optical working line and optical standby line, said radio transmission line having radio working lines corresponding to respective ones of optical working lines and optical standby lines, as well as one radio standby line, said radio equipment comprising:

first detecting means for detecting line condition in each optical working line;

second detecting means for detecting occurrence of failure in each radio working line;

relief-rank management means for making rank for relief of a radio working line corresponding to an optical standby line in a pair with an optical working line having an unsatisfactory line condition higher than rank for relief of radio working lines corresponding to optical standby lines in pairs with optical working lines having a satisfactory line condition; and line changeover control means which, when failure has occurred in two or more radio working lines, is for transmitting data, which is to be sent to a radio working line having a higher rank for relief, via the radio standby line.

14. A radio equipment in an SDH network in which a radio transmission line is introduced between optical transmission lines each of which has N-number of pairs of an optical working line and optical standby line, said radio transmission line having radio working lines corresponding to respective ones of n ($\leq$N)-number of optical working lines and n-number of optical standby lines, as well as one radio standby line, said radio equipment comprising:

first detecting means for detecting occurrence of failure in each optical line;

second detecting means for detecting occurrence of failure in each radio working line;

rank-relief management means for making rank for relief of radio working lines corresponding to optical working lines higher than rank for relief of radio working lines corresponding to optical standby lines; when occurrence of failure in an optical working line has been detected, for making rank for relief of the radio working line corresponding to this optical working line lower than rank for relief of radio working lines corresponding to optical lines that have not failed; and when occurrence of failure in an optical standby line has been detected, for making rank for relief of the radio working line corresponding to this optical standby line lower than rank for relief of radio working lines corresponding to optical standby lines that have not failed; and line changeover control means which, when failure has occurred in two or more radio working lines, is for transmitting data, which is to be sent to a radio working line having a higher rank for relief, via the radio standby line.

15. A radio equipment in an SDH network in which a radio transmission line is introduced between optical transmission lines each of which has plural pairs of an optical working line and optical standby line, said radio transmission line having radio working lines corresponding to respective ones of optical working lines and optical standby lines, as well as one radio standby line, said radio equipment comprising:

first detecting means for detecting line condition in each optical working line;

second detecting means for detecting occurrence of failure in each radio working line;

relief-rank management means for making rank for relief of radio working lines corresponding to optical working lines higher than rank for relief of radio working lines corresponding to optical standby lines, and making rank for relief of a radio working line corresponding to an optical standby line in a pair with an optical working line having an unsatisfactory line condition higher than rank for relief of radio working lines corresponding to optical standby lines in pairs with optical working lines having a satisfactory line condition; and line changeover control means which, when failure has occurred in two or more radio working lines, is for transmitting data, which is to be sent to a radio working line having a higher rank for relief, via the radio standby line.

16. A radio equipment in an SDH network in which a radio transmission line is introduced between optical transmission lines each of which has plural pairs of an optical working line and optical standby line, said radio transmission line having radio working lines corresponding to respective ones of optical working lines and optical standby lines, as well as one radio standby line, said radio equipment comprising:

first detecting means for detecting line condition in each optical working line;

second detecting means for detecting occurrence of failure in each radio working line;

relief-rank management means for (1) making rank for relief of radio working lines corresponding to optical working lines higher than rank for relief of radio working lines corresponding to optical standby lines; (2) when occurrence of failure in an optical working line has been detected, for making rank for relief of the radio working line corresponding to this optical working line lower than rank for relief of radio working lines corresponding to optical lines that have not failed and, when occurrence of failure in an optical standby line has been detected, for making rank for relief of the radio working line corresponding to this optical standby line lower than rank for relief of radio working lines corresponding to optical standby lines that have not failed; and (3) for making rank for relief of a radio working line corresponding to an optical standby line in a pair with an optical working line having an unsatisfactory line condition higher than rank for relief of radio working lines corresponding to optical standby lines in pairs with optical working lines having a satisfactory line condition; and line changeover control means which, when failure has occurred in two or more radio working lines, is for transmitting data, which is to be sent to a radio working line having a higher rank for relief, via the radio standby line.

* * * * *